(12) United States Patent
Nedachi et al.

(10) Patent No.: US 9,303,752 B2
(45) Date of Patent: Apr. 5, 2016

(54) SHIFT CHANGE CONTROLLING APPARATUS

(75) Inventors: Yoshiaki Nedachi, Wako (JP); Hiroyuki Kojima, Wako (JP); Dai Arai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 718 days.

(21) Appl. No.: 13/013,353

(22) Filed: Jan. 25, 2011

(65) Prior Publication Data

US 2011/0190990 A1    Aug. 4, 2011

(30) Foreign Application Priority Data

Feb. 3, 2010    (JP) .................................. 2010-022150

(51) Int. Cl.
| | |
|---|---|
| *F16H 59/72* | (2006.01) |
| *F16H 57/00* | (2012.01) |
| *F16D 48/06* | (2006.01) |
| *F16H 61/06* | (2006.01) |
| *F16H 61/688* | (2006.01) |

(52) U.S. Cl.
CPC .......... *F16H 57/0006* (2013.01); *F16D 48/064* (2013.01); *F16H 61/061* (2013.01); *F16H 61/688* (2013.01); *F16D 2500/1025* (2013.01); *F16D 2500/1026* (2013.01); *F16D 2500/1086* (2013.01); *F16D 2500/3024* (2013.01); *F16D 2500/30803* (2013.01); *F16D 2500/50236* (2013.01); *F16D 2500/7044* (2013.01); *F16H 2306/18* (2013.01); *Y10T 74/20024* (2015.01)

(58) Field of Classification Search
USPC ......................................................... 701/51
IPC ............ F16H 2003/0807,2061/047, 2200/0065, F16H 2312/022, 3/093; F16D 48/064, 48/066, F16D 2500/1025, 2500/1026
See application file for complete search history.

(56) References Cited

U.S. PATENT DOCUMENTS

| | | | |
|---|---|---|---|
| 6,186,924 B1 * | 2/2001 | Ohtsuka ......................... | 477/155 |
| 6,285,942 B1 * | 9/2001 | Steinmetz et al. .............. | 701/67 |
| 2004/0111205 A1 * | 6/2004 | Inoue et al. ..................... | 701/67 |
| 2007/0137336 A1 * | 6/2007 | Burk et al. ...................... | 74/335 |

(Continued)

FOREIGN PATENT DOCUMENTS

| | | |
|---|---|---|
| EP | 2042780 A1 | 4/2009 |
| JP | 2009-079616 A | 4/2009 |

(Continued)

*Primary Examiner* — Stefanos Karmis
*Assistant Examiner* — Michael E Butler
(74) *Attorney, Agent, or Firm* — Squire Patton Boggs (US) LLP

(57) ABSTRACT

The twin clutch-type transmission can include a hydraulic twin clutch including the first clutch and the second clutch disposed on main shafts. The shift change controlling apparatus is configured to control shift change operation to and adjacent speed change stage by alternately changing an engagement state of the first clutch and the second clutch. The shift change controlling apparatus can also execute a pre-shift change of supplying a pre-pressure on one of the first and second clutches, while another of the first and second clutches is engaged. The pre-pressure provides a pre-engagement of the unengaged clutch. First and second clutch actuators are configured to actuate the first and second clutches, respectively. When the pre-shift change is executed, the pre-pressure is applied for a predetermined period and then removed prior to a driving of a shift gear or actuating a shift change.

10 Claims, 31 Drawing Sheets

(56) References Cited

U.S. PATENT DOCUMENTS

| | | | |
|---|---|---|---|
| 2008/0125927 A1* | 5/2008 | Gohring et al. | 701/22 |
| 2008/0125945 A1* | 5/2008 | Lee | 701/55 |
| 2009/0078069 A1* | 3/2009 | Nedachi et al. | 74/330 |
| 2009/0138162 A1* | 5/2009 | Futamura | 701/55 |
| 2009/0150035 A1* | 6/2009 | Soliman et al. | 701/54 |
| 2009/0247358 A1 | 10/2009 | Kojima et al. | |
| 2009/0299590 A1* | 12/2009 | Nedachi et al. | 701/68 |
| 2010/0057318 A1* | 3/2010 | Nedachi et al. | 701/68 |
| 2010/0106364 A1* | 4/2010 | Sagisaka | 701/36 |
| 2010/0106393 A1* | 4/2010 | Sgatti et al. | 701/111 |
| 2010/0222971 A1* | 9/2010 | Takahashi et al. | 701/51 |
| 2011/0004380 A1* | 1/2011 | Kojima et al. | 701/53 |
| 2011/0077835 A1* | 3/2011 | Otsuka | 701/99 |
| 2012/0022755 A1* | 1/2012 | Oda et al. | 701/58 |

FOREIGN PATENT DOCUMENTS

| | | | |
|---|---|---|---|
| JP | 2009243630 A | * | 10/2009 |
| JP | 2010059995 A | * | 3/2010 |
| WO | WO 2010116870 A1 | * | 10/2010 |

* cited by examiner

Clutch 1 capacity correction coefficient base table upon occurrence of racing

Table of shift change torque Qh - ΔNe on shift change

Clutch off decision time table for shift up

Clutch off decision time table for shift down

SHIFT CHANGE CONTROLLING APPARATUS

BACKGROUND

1. Field

This invention relates to a shift change controlling apparatus, and particularly to a shift change controlling apparatus which uses an actuator to control a clutch between engagement and disengagement.

2. Description of the Related Art

Conventionally, an automatic transmission of the twin clutch type is known which includes a clutch on one side corresponding to odd-numbered shift change stages and another clutch on the other side corresponding to even-numbered shift change stages and passes a clutch engagement state alternately between the clutches to carry out a shift change operation.

Patent Document 1, which refers to Japanese patent laid-open No. 2009-79616, discloses a technique of a shift change controlling apparatus for an automatic transmission of the twin clutch type which operates in response to supply of an oil pressure thereto. While the clutch on the one side (on the other side) is engaged for traveling, a very low oil pressure (pre-pressure) is applied to the clutch on the other side (on the one side) so that the clutch is engaged a little thereby to eliminate a play in a rotational direction between parts to which rotational power is transmitted by the other side clutch to prevent generation of sound by the play.

SUMMARY

In a shift gear of the twin clutch type, during traveling with the one side clutch engaged, "pre-shift change" of preparing a next shift gear corresponding to the other side clutch is executed so that a shift change operation can be executed only by a passing operation of the clutch. However, in a state in which a pre-pressure is applied to the other side clutch by the technique disclosed in Patent Document 1, since a main shaft corresponding to the other side clutch is rotating a little, if the preparatory shift change is carried out directly, then hammering occurs when a dog clutch of the shift gear is engaged.

An object of certain embodiments of the present invention resides in provision of a shift change controlling apparatus which solves the subject of the prior art described above and can prevent occurrence of hammering relating to the other side clutch during traveling with one side clutch and prevent also occurrence of hammering upon pre-shift change.

In order to attain the object described above, according to the present invention, a shift change controlling apparatus for a twin clutch type transmission (23) which includes a hydraulic twin clutch (26) including a first clutch (51a) and a second clutch (51b) disposed on main shafts (43, 44) of a transmission (47) and allows a shift change operation to an adjacent shift change stage by alternately changing over an engagement state of the clutches and besides executes pre-shift change of supplying, during ordinary traveling with the clutch on one side engaged, a pre-pressure for operating the clutch on the other side by a small amount toward the engagement side and creating in advance a state in which power transmission using a shift gear train corresponding to a next shift position can be carried out when the pre-shift change is executed, within a period after a signal for driving clutch actuators (91a, 91b) for supplying a pre-pressure in a direction in which the pre-pressure is removed is issued until driving of the shift gear as the pre-shift change is started, a predetermined pre-shift change waiting time at least corresponding to a speed of rotation of said main shafts (43, 44) is provided.

The shift change controlling apparatus can have another characteristic in that the predetermined pre-shift change waiting time is set in response to viscosity of operating oil of said clutches (51a, 51b) in addition to the speed of rotation of said main shafts (43, 44).

The shift change controlling apparatus has a third characteristic in that the predetermined pre-shift change waiting time is set to be longer as the speed of rotation of said main shafts (43, 44) increases and as the viscosity of the operating oil increases.

The shift change controlling apparatus has a fourth characteristic in that the viscosity of the operating oil is detected based on an oil temperature of the operating oil.

The shift change controlling apparatus has a fifth characteristic in that a calculation process of the predetermined waiting time is executed after an output value of an oil pressure sensor (SE8, SE9) provided for an oil pressure supply path to the clutches drops lower than a predetermined value.

The shift change controlling apparatus has a sixth characteristic in that the predetermined pre-shift change waiting time is set separately and independently of each other between a case of pre-shift change upon a shift up and another case of pre-shift change upon a shift down.

The shift change controlling apparatus has a seventh characteristic in that the predetermined pre-shift change waiting time is applied also when, after the clutch which is to become the disconnection side upon completion of the shift change is released, N establishment shift change of canceling the engagement of a dog clutch of a shift gear train of the disconnection side clutch to establish a neutral state is executed.

The shift change controlling apparatus has an eighth characteristic in that the predetermined pre-shift change waiting time is set separately and independently of each other between a case of pre-shift change upon a shift up and another case of pre-shift change upon a shift down, and is set longer in the case of the pre-shift change upon the shift down than in the case of the pre-shift change upon the shift up.

According to the first characteristic, when the pre-shift change is executed, within the period after a signal for driving the clutch actuators for supplying a pre-pressure is driven in the direction in which the pre-pressure is removed is issued until driving of the shift gear as the pre-shift change is started, the predetermined pre-shift change waiting time at least corresponding to the speed of rotation of the main shafts is provided. Therefore, suitable pre-shift change waiting time for the removing degree of the pre-pressure to the clutch can be set in response to the speed of rotation of the main shafts. Consequently, occurrence of hammering originating from the other side clutch during traveling with the one side clutch is prevented, and appropriate pre-shift change which does not suffer from hammering can be executed.

According to the second characteristic, the predetermined pre-shift change waiting time is set in response to the viscosity of the operating oil of the clutches in addition to the speed of rotation of the main shafts. Therefore, the pre-shift change waiting time can be set appropriately also for a case in which, because the viscosity of the operating oil of the clutch is high, the friction or the like between clutch disks becomes high and the pre-pressure is less likely to be removed or in a like case.

According to the third characteristic, the predetermined pre-shift change waiting time is set longer as the speed of rotation of the main shafts increases and as the viscosity of the operating oil increases. Therefore, the pre-shift change waiting time can be set taking both of the influence of centrifugal force of the shift gear in a transition state of the clutch oil pressure and the influence of clutch drag and so forth by the viscosity of the operating oil.

According to the fourth characteristic, the viscosity of the operating oil is detected based on the oil temperature of the operating oil. Therefore, the viscosity of the operating oil can be decided based on the oil temperature which relates closely to the viscosity of the operating oil and can be detected by a simple sensor.

According to the fifth characteristic, the calculation process of the predetermined waiting time is executed after the output value of the oil pressure sensor provided for the oil pressure supply path to the clutches drops lower than the predetermined value. Therefore, setting of the waiting time is carried out after the oil pressure detected in the oil pressure supply path drops, and it is possible to set the pre-shift change waiting time taking only the centrifugal force or the viscosity of the operating oil into consideration.

According to the sixth characteristic, the predetermined pre-shift change waiting time is set separately and independently of each other between the case of pre-shift change upon a shift up and the case of pre-shift change upon a shift down. Therefore, when waiting time which provides a time lag upon shift change is to be set, it is possible to set pre-shift change waiting time suitable for the case of a shift up for which quick shift change is demanded frequently and pre-shift change waiting time suitable for the case of a shift down upon which, even if the start timing of the pre-shift change is delayed in comparison with that upon a shift up, this is permitted.

According to the seventh characteristic, the predetermined pre-shift change waiting time is applied also when, after the clutch which is to become the disconnection side upon completion of the shift change is released, N establishment shift change of canceling the engagement of a dog clutch of a shift gear train of the disconnection side clutch to establish a neutral state is executed. Therefore, the N establishment shift change can be executed smoothly without separately calculating the waiting time for the N establishment shift change.

According to the eighth characteristic, the predetermined pre-shift change waiting time is set separately and independently of each other between the case of pre-shift change upon a shift up and the case of pre-shift change upon a shift down, and is set longer in the case of the pre-shift change upon the shift down than in the case of the pre-shift change upon the shift up. Therefore, in conformity with the fact that, upon a shift down, the engine speed rises and the influence of the centrifugal force increases but, upon a shift up, the engine speed drops and the influence of the centrifugal force decreases, the pre-shift change waiting time upon a shift down can be set longer than that upon a shift up.

DETAILED DESCRIPTION

In the following, an embodiment of the present invention is described in detail with reference to the drawings. In the following description, unless otherwise specified, the directions such as forward, backward, leftward and rightward directions are same as those of a vehicle. Further, an arrow mark FR in the figures indicates the forward direction of the vehicle and an arrow mark LH indicates the leftward direction of the vehicle while an arrow mark UP indicates an upward direction of the vehicle.

Figure 1:
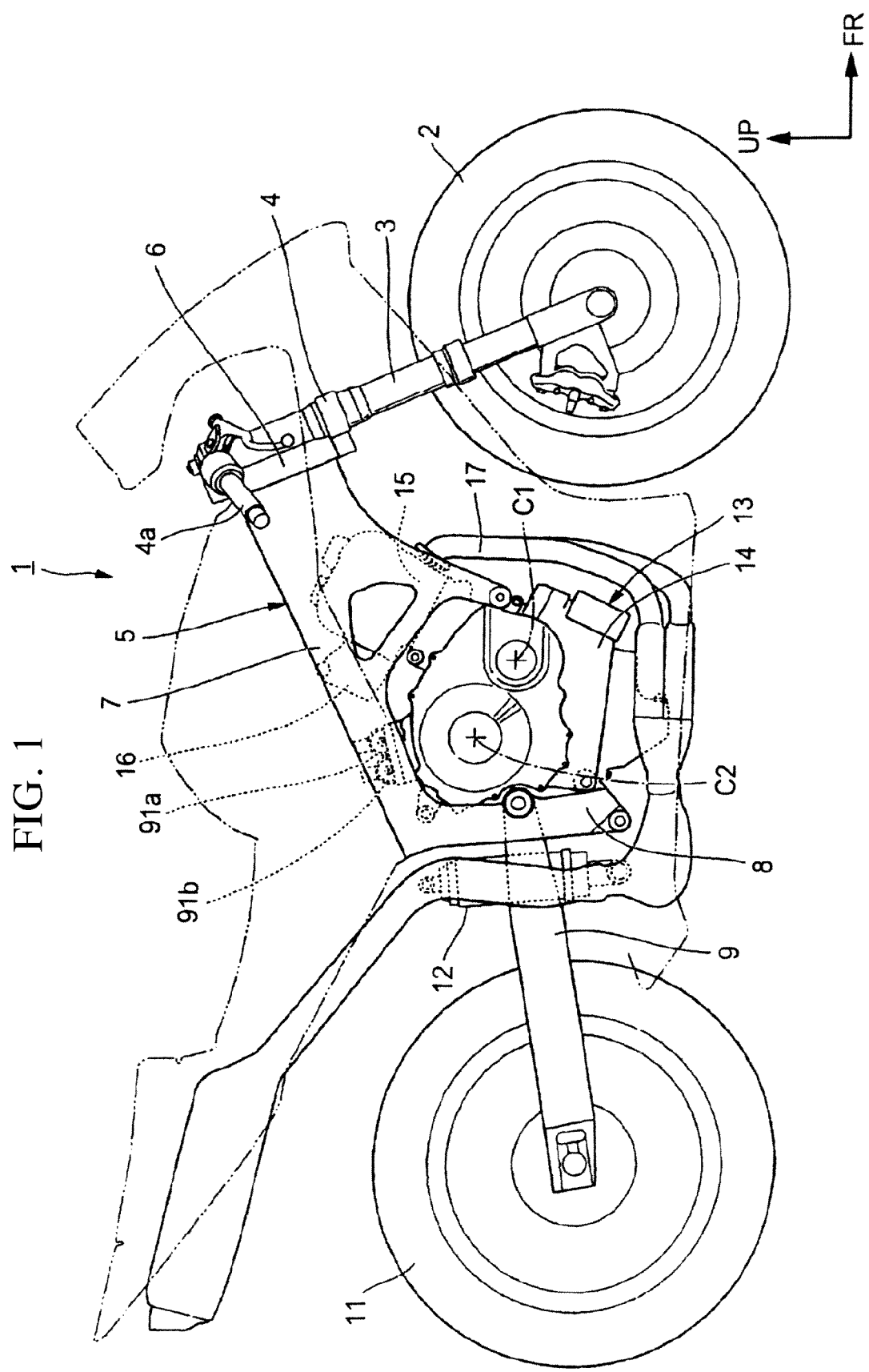
FIG. 1 is a side elevational view of a motorcycle according to an embodiment of the present invention.

FIG. 1 is a side elevational view of a motorcycle 1 as a saddle type vehicle to which a shift change controlling apparatus according to the present invention is applied. A front fork 3 for supporting a front wheel 2 for rotation thereon is supported at an upper portion thereof for steering motion on a head pipe 6 at a front end portion of a vehicle body frame 5 through a steering stem 4. A steering handle bar 4a is attached at an upper portion of the steering stem 4. A main frame 7 extends rearwardly from a rear portion of the head pipe 6 and connects to a pivot plate 8. On the pivot plate 8, a swing arm 9 is supported at a front end portion thereof for upward and downward rocking motion, and a rear wheel 11 is supported for rotation at a rear end portion of the swing arm 9. A cushion unit 12 is interposed between the swing arm 9 and the vehicle body frame 5. An engine 13 serving as a power source for the motorcycle 1 is attached to the inner side of the vehicle body frame 5.

Figure 2:
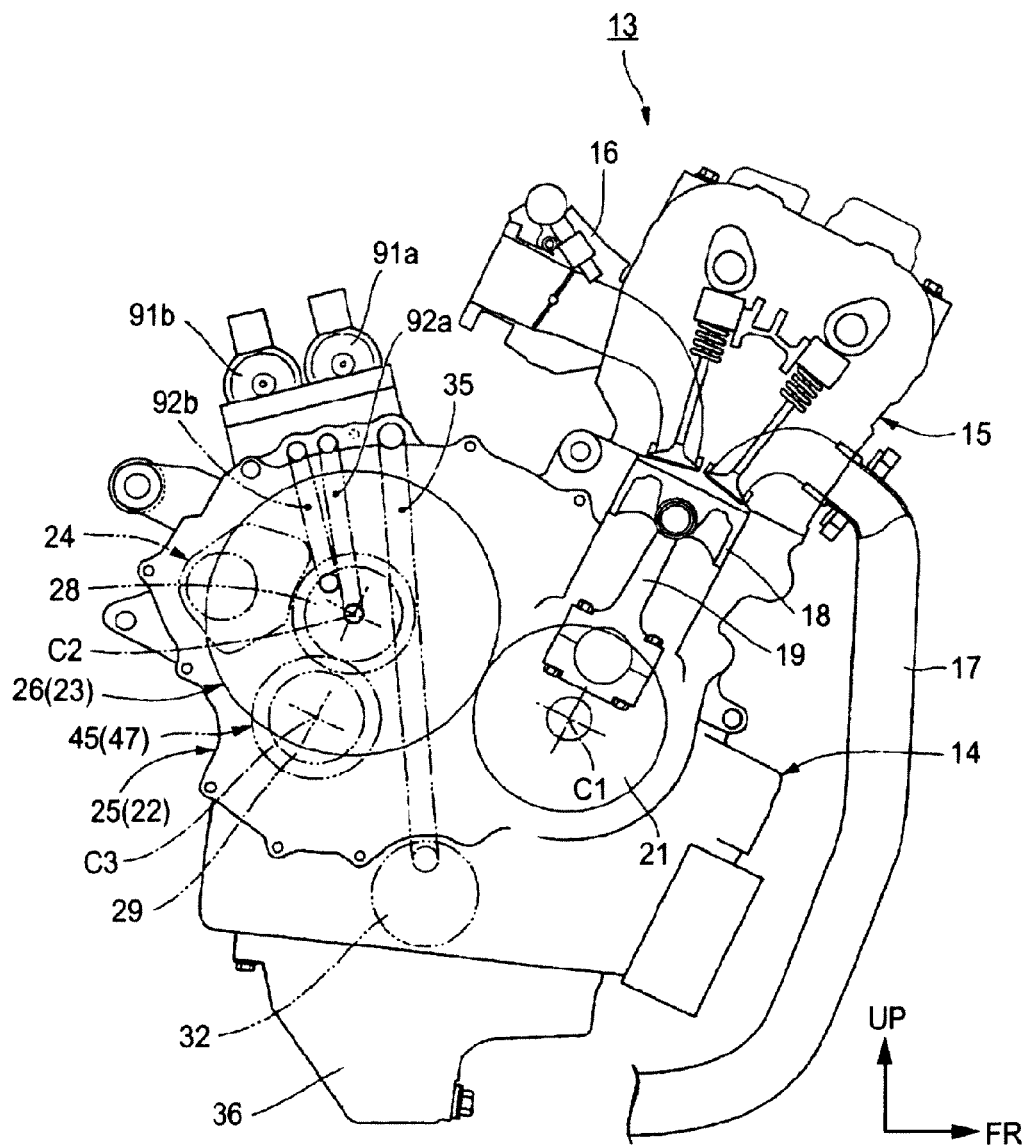
FIG. 2 is a right side elevational view of an engine of the motorcycle.

Referring also to FIG. 2, the engine 13, in this example, is of the parallel four-cylinder type with a rotation center axial line C1 of a crankshaft 21 thereof directed along a vehicle widthwise direction, and a cylinder block 15 is provided uprightly at an upper portion of a crankcase 14. A piston 18 corresponding to each cylinder is fitted for back and forth movement in the cylinder block 15. The back and forth movement of the pistons 18 is converted into rotational movement of a crankshaft 21 through connecting rods 19. A throttle body 16 is connected to a rear portion of the cylinder block 15, and an exhaust pipe 17 is connected to a front portion of the cylinder block 15.

A mission case 22 connects integrally to a rear portion of the crankcase 14, and a twin clutch type transmission 23 and a change mechanism 24 are accommodated in the mission case 22. A clutch case 25 is provided on the right side of the mission case 22 in the vehicle widthwise direction, and a twin clutch 26 of the twin clutch type transmission 23 is accommodated in the inside of the clutch case 25. Rotational power of the crankshaft 21 is outputted to the left side of the mission case 22 in the vehicle widthwise direction through the twin clutch type transmission 23 and then transmitted to the rear wheel 11, for example, through a power transmitting mechanism of the chain type. Below a main shaft 28 disposed so as to be directed to a direction of a rotation center axial line C2, a countershaft 29 is disposed such that it is directed to a direction of a rotation center axial line C3.

Figure 3:
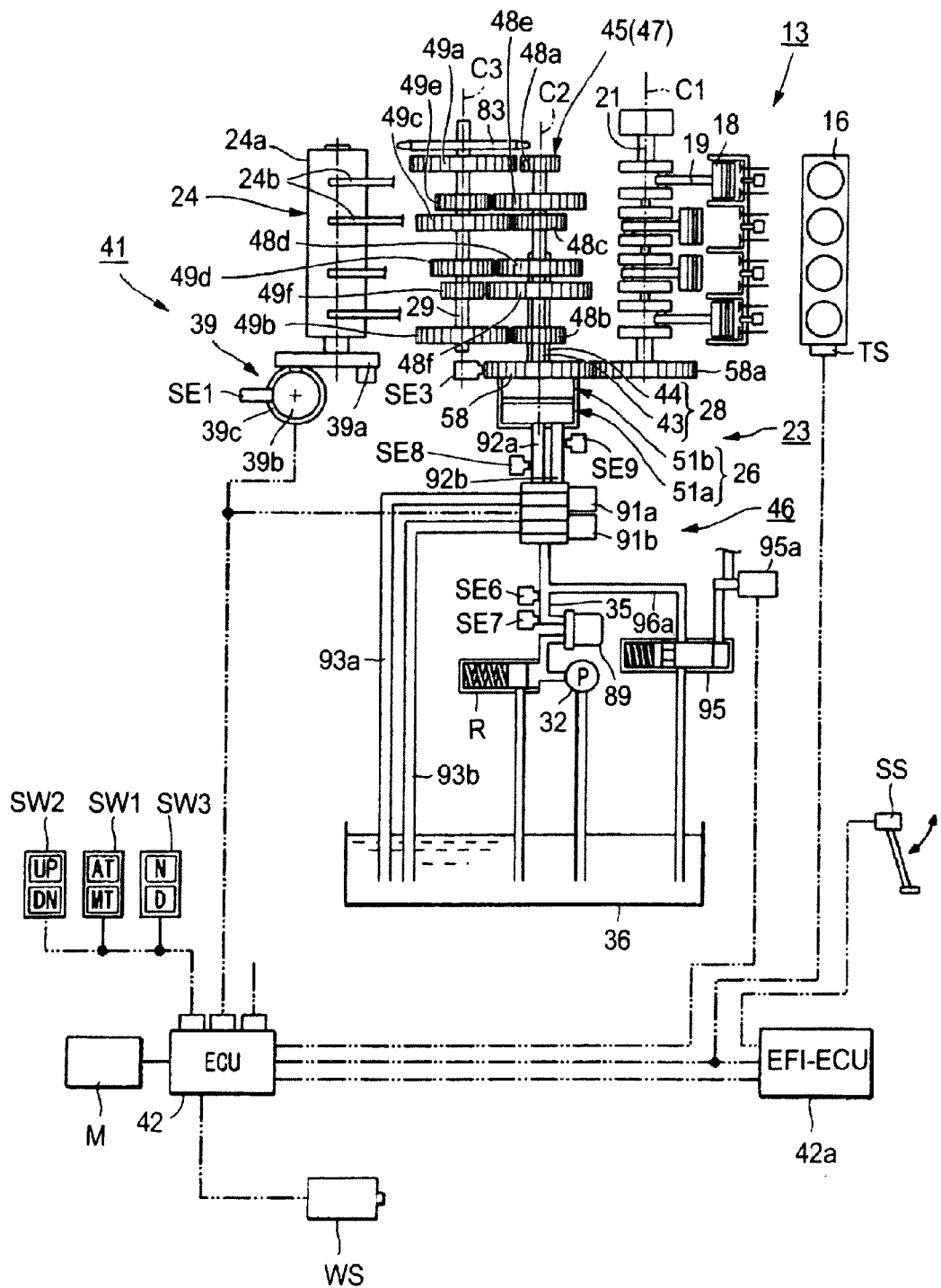
FIG. 3 is a schematic view of a twin clutch type transmission controlling apparatus.
Figure 4:
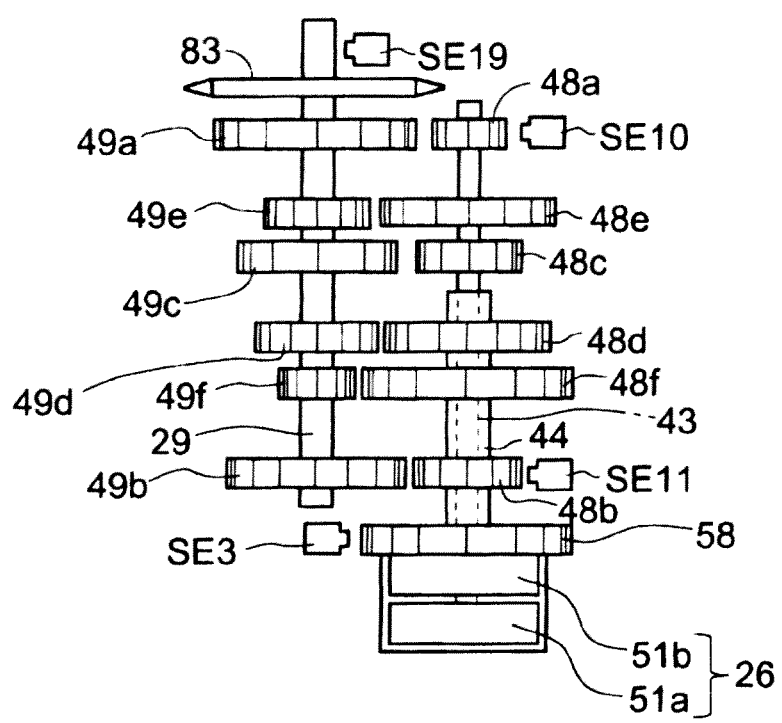
FIG. 4 is a schematic view illustrating a meshing relationship of shafts and shift gears of an automatic transmission.
Figure 5:
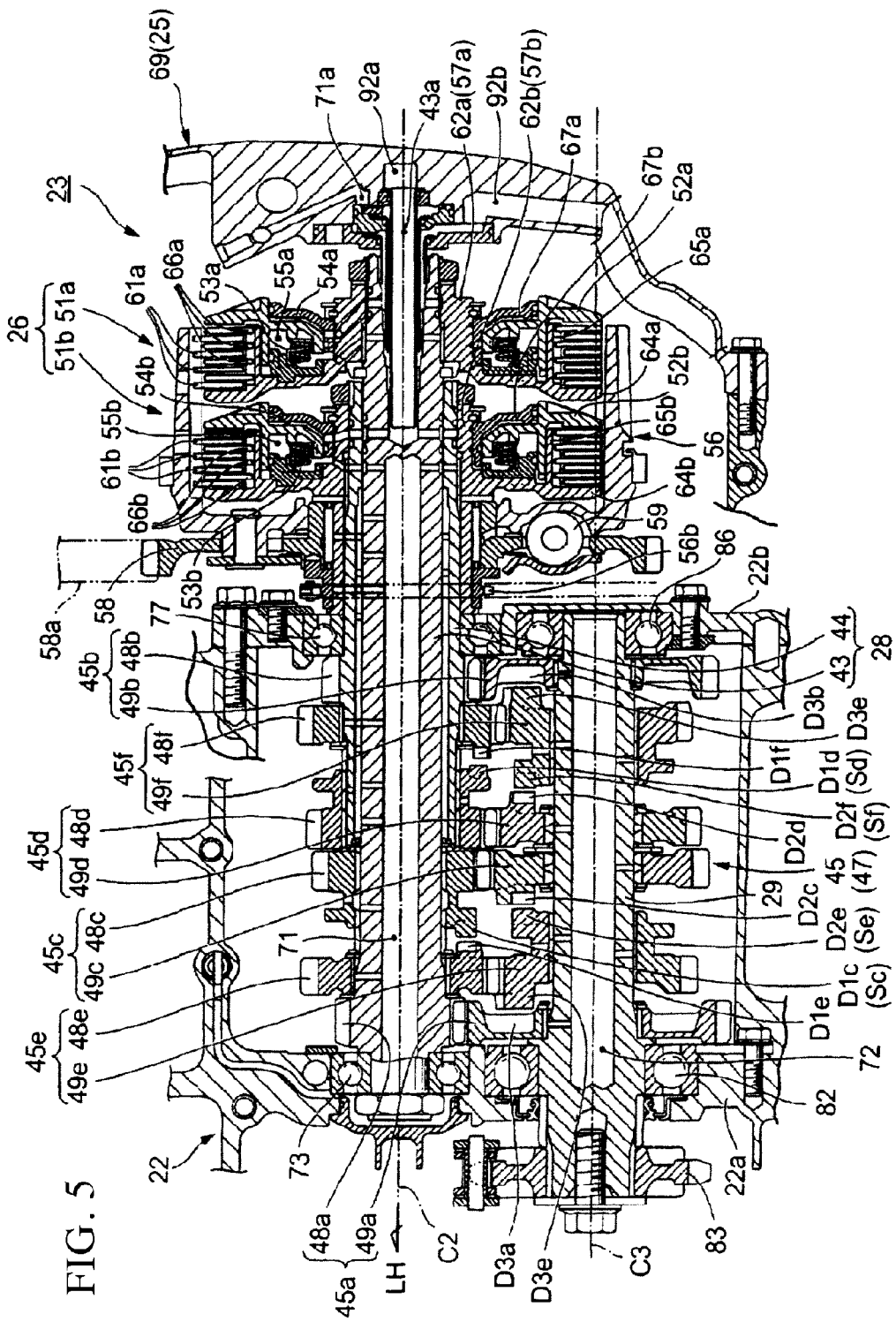
FIG. 5 is a sectional view of a twin clutch type transmission.
Figure 6:
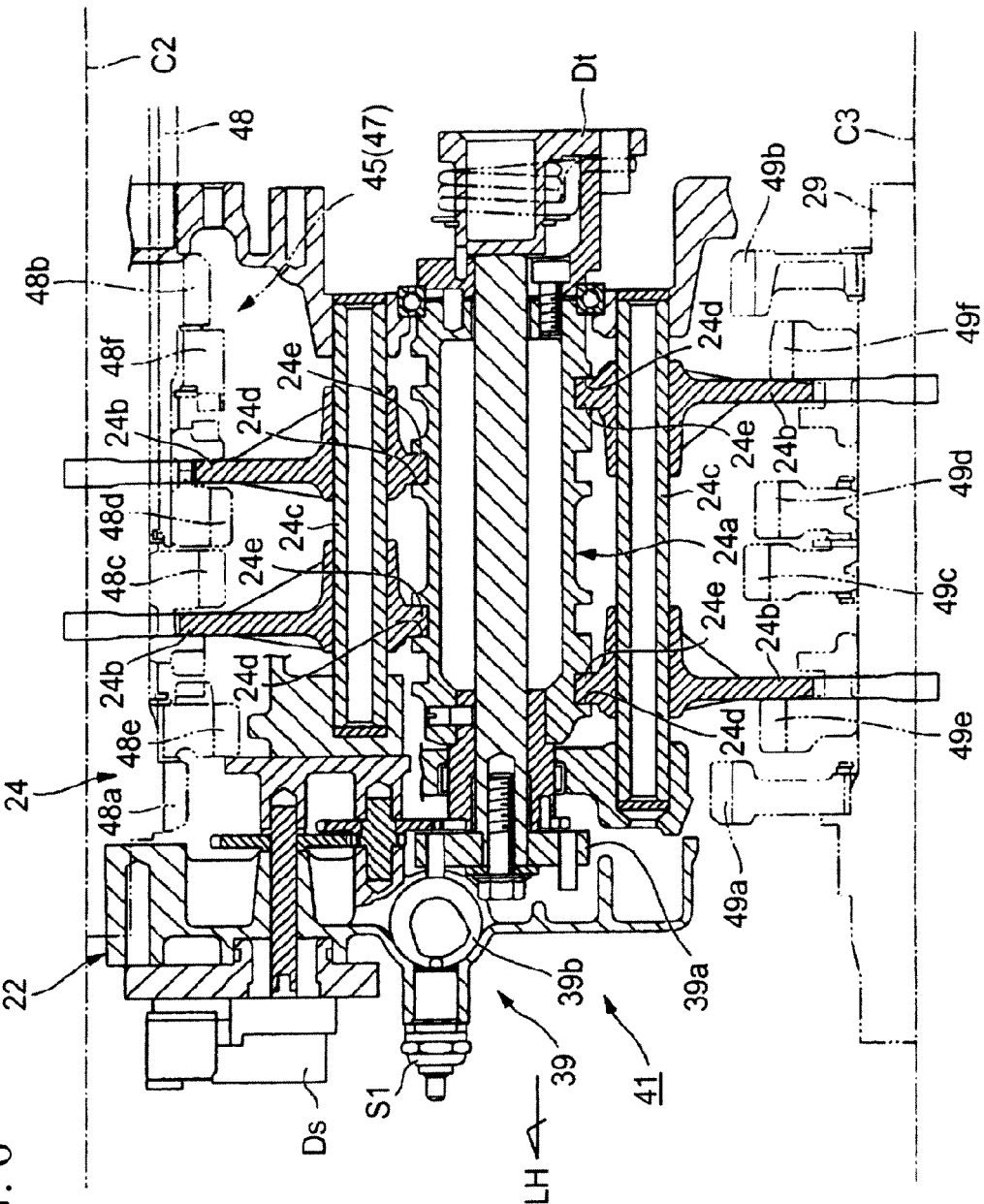
FIG. 6 is a sectional view of a gear shift apparatus.

FIG. 3 is a schematic view showing a configuration of the twin clutch type shift change controlling apparatus. Meanwhile, FIG. 4 is a schematic view illustrating a meshing relationship of shafts and shift gears of an automatic transmission, and FIG. 5 is a sectional view of the twin clutch type transmission. Further, FIG. 6 is a sectional view of a gear shift apparatus of the twin clutch type transmission.

The twin clutch type shift change controlling apparatus is configured principally from the twin clutch type transmission 23 connected to the engine 13, a gear shift apparatus 41 including the change mechanism 24 in which a driving mechanism 39 is provided, and an electronic control unit (ECU) 42 for controlling operation of the twin clutch type transmission 23 and the gear shift apparatus 41.

The twin clutch type transmission 23 includes the main shaft 28 of a dual structure including an inner shaft 43 and an outer shaft 44, the countershaft 29 disposed in parallel to the main shaft 28, a shift gear group 45 disposed across the main shaft 28 and the countershaft 29, the twin clutch 26 disposed coaxially at a right end portion of the main shaft 28 in the vehicle widthwise direction, and an oil pressure supplying apparatus 46 for supplying an operating oil pressure to the twin clutch 26. In the following description, an aggregate of the main shaft 28, countershaft 29 and shift gear group 45 is referred to as transmission 47.

The main shaft 28 is configured such that the inner shaft 43 extending leftwardly and rightwardly in the vehicle widthwise direction of the mission case 22 is fitted at a right side portion thereof for relative rotation in the outer shaft 44. Driving gears 48a, 48b, 48c, 48d, 48e and 48f (hereinafter referred to as 48a to 48f) for six speeds of the shift gear group 45 are disposed in a distributed manner on outer peripheries of the inner and outer shafts 43 and 44. Meanwhile, driven gears 49a, 49b, 49c, 49d, 49e and 49f (hereinafter referred to as 49a to 49f) for the six speeds of the shift gear group 45 are disposed on an outer periphery of the countershaft 29.

The driving gears 48a to 48f and the driven gears 49a to 49f mesh with each other between corresponding gear shift stages to configure shift gear trains 45a, 45b, 45c, 45d, 45e and 45f (hereinafter referred to as 45a to 45f) corresponding to the respective gear shift stages (refer to FIG. 5). The shift gear trains 45a to 45f are set such that the reduction gear ratio successively decreases from the first speed to the sixth speed.

Referring to FIG. 5, a left end portion of the inner shaft 43 in the vehicle widthwise direction extends to a left side wall 22a of the mission case 22 and is supported for rotation on the left side wall 22a by a ball bearing 73. Meanwhile, a right side portion of the inner shaft 43 extends through a right side wall 22b of the mission case 22 to the inside of the clutch case 25, and the inner shaft 43 is supported at a leftward and rightward intermediate portion thereof for rotation on the right side wall 22b of the mission case 22 through a leftward and rightward intermediate portion of the outer shaft 44 which extends similarly through the right side wall 22b and a ball bearing 77.

The outer shaft 44 is shorter than the inner shaft 43, and a left end portion of the outer shaft 44 is positioned at a leftward and rightward intermediate portion of the mission case 22. At a portion of the outer shaft 44 which is positioned leftwardly of the right side wall 22b, the driving gears 48d, 48f and 48b corresponding to the even-numbered shift change stages (2nd, 4th and 6th speeds) are supported in the order of those for the second, fourth and sixth speeds, respectively, from the left side. Meanwhile, at a portion of the inner shaft 43 which is positioned leftwardly of the left end portion of the outer shaft 44, the driving gears 48a, 48e and 48c corresponding to the odd-numbered shift change stages (1st, 3rd and 5th speeds) are supported in the order of those for the first, fifth and third speeds, respectively, from the left side.

The countershaft 29 is supported at left and right end portions thereof for rotation on the left and right side walls 22a and 22b of the mission case 22 through ball bearings 82 and 86, respectively. The left end portion of the countershaft 29 projects leftwardly of the left side wall 22a, and a driving sprocket wheel 83 as a power transmission mechanism to the rear wheel 11 is attached to the left end portion of the countershaft 29.

At a portion of the countershaft 29 which is positioned in the inside of the mission case 22, the driven gears 49a to 49f corresponding to the shift change stages are supported in order similar to that of the driving gears 48a to 48f.

In the inside of the main shaft 28 (inner shaft 43) and the countershaft 29, main supply oil paths 71 and 72 which can supply oil pressure from an oil pump (not shown) for pressure feeding of oil to individual portions in the engine 13 are formed, respectively. Engine oil is supplied suitably to the shift gear group 45 through the main supply oil paths 71 and 72.

The twin clutch 26 has first and second clutches 51a and 51b of the hydraulic type disposed coaxially adjacent each other, and the inner and outer shafts 43 and 44 are coaxially connected to the first and second clutches 51a and 51b, respectively. On a clutch outer 56 which is shared by the first and second clutches 51a and 51b, a primary driven gear 58 which meshes with a primary driving gear 58a of the crankshaft 21 is provided coaxially, and rotational power from the crankshaft 21 is inputted to the clutch outer 56 through the gears 58 and 58a. The rotational power inputted to the clutch outer 56 is individually transmitted to the inner and outer shafts 43 and 44 in response to an engagement/disengagement state of the first and second clutches 51a and 51b. The engagement state of the first and second clutches 51a and 51b is controlled individually depending upon presence/absence of supply of oil pressure from the oil pressure supplying apparatus 46.

One of the clutches 51a and 51b is placed into an engagement state while the other is placed into a disengagement state to carry out power transmission in the transmission 47 using the shift gear train connected to one of the inner and outer shafts 43 and 44 while one of those shift gear trains connected to the other of the inner and outer shafts 43 and 44 which is to be used substantially is selected in advance. From this state, one of the clutches 51a and 51b is placed into a disengagement state while the other is placed into an engagement state. By this, the path for the power transmission of the transmission 47 is changed over to that which uses the shift gear train selected in advance thereby to carry out shift up or shift down of the transmission 47.

As shown in FIG. 3, the oil pressure supplying apparatus 46 includes a clutch oil pump 32 which is an oil pressure generating source for the twin clutch 26, a feed oil path 35 extending from a discharge port of the clutch oil pump 32, first and second clutch actuators 91a and 91b connected to the downstream side of the feed oil path 35, and first and second supply oil paths 92a and 92b extending from the clutch actuators 91a and 91b to engagement side hydraulic chambers 54a and 54b (refer to FIG. 5) of the clutches 51a and 51b, respectively.

The clutch oil pump 32 is provided separately from the main oil pump described hereinabove, and sucks engine oil in an oil pan 36 below the crankcase 14 and discharges the engine oil into the feed oil path 35. An oil filter 89 for exclusive use for the feed oil path 35 is provided in the feed oil path 35. The feed oil path 35 includes an oil pressure sensor SE6 and an oil temperature sensor SE7 for detecting an oil pressure and an oil temperature, respectively, and a relief valve R for controlling the rise of the oil pressure in the feed oil path 35. Further, in the supply oil paths 92a and 92b, a first clutch oil pressure sensor SE8 and a second clutch oil pressure sensor SE9 for detecting a supply oil pressure to the first and second clutches 51a and 51b, are provided respectively.

The feed oil path 35 and the first and second supply oil paths 92a and 92b can be communicated individually with each other by operation of the clutch actuators 91a and 91b each formed from a solenoid valve. If the feed oil path 35 and the first supply oil path 92a are communicated with each other through the first clutch actuator 91a, then a comparatively high oil pressure from the clutch oil pump 32 is supplied to the engagement side hydraulic chamber 54a of the first clutch 51a to place the first clutch 51a into an engagement state. On the other hand, if the feed oil path 35 and the second supply oil path 92b are communicated with each other through the second clutch actuator 91b, then the oil pressure from the clutch oil pump 32 is supplied to the engagement side hydraulic chamber 54b of the second clutch 51b so that the second clutch 51b is placed into an engagement state.

A oil pressure escapement oil path 96a having an oil pressure escape valve 95 branches from the feed oil path 35. The oil pressure escape valve 95 is rendered operative by a valve actuator 95a to change over the oil pressure escapement oil path 96a between communication and discommunication. The valve actuator 95a whose operation is controlled by the ECU 42 renders the oil pressure escapement oil path 96a communicating, for example, upon starting of the engine to return a feed oil pressure from the clutch oil pump 32 to the oil pan 36 and then renders the oil pressure escapement oil path 96a discommunicating after starting of the engine to make supply of the feed oil pressure to the twin clutch 26 possible.

Further, in the clutch actuators 91a and 91b, returning oil paths 93a and 93b for returning oil pressure from the clutch oil pump 32 into the inside of the oil pan when the communication between the feed oil path 35 and the first and second supply oil paths 92a and 92b is canceled, respectively.

The change mechanism 24 moves a plurality of (four in the present embodiment) shift forks 24b in an axial direction by rotation of a shift drum 24a disposed in parallel to the shafts 28 and 29 to change over the shift gear pair (shift change stage) to be used for power transmission between the main shaft 28 and the countershaft 29.

The shift forks 24b are paired such that one of them which extends toward the main shaft 28 side and another one of them which extends toward the countershaft 29 side make a pair, and are supported on the base end side thereof for movement in an axial direction by a pair of shift fork rods 24c. On the base end side of each shift fork 24b, a sliding projection 24e for engaging with one of a plurality of camshafts 24d on an outer periphery of the shift drum 24a is provided, respectively. Each shift fork 24b is held at an end portion thereof in engagement with a slide gear (hereinafter described) of the shift gear group 45 on the main shaft 28 side and the countershaft 29 side. And, if the shift drum 24a rotates, then each shift fork 24b moves in accordance with the pattern of each cam groove 24d to move the slide gear in an axial direction to vary the shift change stage of the transmission 47.

The driving mechanism 39 provided on one end side of the shift drum 24a includes a pin gear 39a coaxially secured to the shift drum 24a of the change mechanism 24, a barrel cam 39b in the form of a worm wheel engaging with the pin gear 39a, and an electric motor 39c for applying rotational power to the barrel cam 39b. In the driving mechanism 39, when the electric motor 39c is driven, it suitably rotates the shift drum 24a to vary the shift change stage of the transmission 47. For the driving mechanism 39, a gear position sensor SE1 for detecting the amount of operation of the driving mechanism 39 in order to detect the shift change stage of the transmission 47 is provided. On the transmission gear which meshes with a left end portion of the shift drum 24a, a rotational angle sensor Ds for detecting the angle of rotation of the shift drum 24a is provided, and at a right end portion of the shift drum 24a, a rotary shaft and a detent mechanism (lost-motion mechanism) Dt for the shift drum 24a are disposed.

The transmission 47 is of the normally meshing type wherein the driving gears 48a to 48f and the driven gears 49a to 49f corresponding to the individual shift change stages normally mesh with each other. The gears are roughly divided into fixed gears mounted for integral rotation on the support shafts (shafts 28 and 29), free gears rotatable with respect to the individual support shafts, and slide gears mounted for integral rotation and for movement in an axial direction with respect to the individual shafts.

In particular, the driving gears 48a and 48b are fixed gears while the driving gears 48c and 48d are slide gears and the driving gears 48e and 48f are free gears. Meanwhile, the driven gar wheels 49a to 49d are free gears and the driven gar wheels 49e and 49f are slide gears. In the following description, the gears 48c, 48d, 49e and 49f are sometimes referred to as slide gears while the gears 48e and 48f and 49a to 49d are sometimes referred to as free gears. And, by suitably slidably moving (axially moving) an arbitrary gear by means of the change mechanism 24, power transmission using a shift gear train in response to one of the shift change stages is permitted.

On one side of the slide gears 48c and 48d, slide rings Sc and Sd which are integrally rotatable and axially movable with respect to the respective support shafts similarly to the driving gears 48c and 48d are provided integrally. The slide rings Sc and Sd are provided adjacent the driving gears 48e and 48f in the axis direction, respectively. On the slide rings Sc and Sd, slide side dogs (dowels) D1c and D1d are provided, respectively, and free side dogs (dowels) D1e and D1f corresponding to the slide side dogs D1c and D1d are provided on the driving gears 48e and 48f, respectively.

Further, on one side of the driven gears 49e and 49f, slide rings Se and Sf which are integrally rotatable and axially movable with respect to the respective support shafts similarly to the driven gar wheels 49e and 49f are provided integrally. The slide rings Se and Sf are provided adjacent the free gears 49c and 49d in the axial direction, respectively. Slide side dogs (dowels) D2e and D2f are provided on the slide rings Se and Sf, and free side dogs (dowels) D2c and D2d corresponding to the slide side dogs D2e and D2f are provided on the free gears 49c and 49d, respectively.

Further, on the other side of the slide gears 49e and 49f, slide side dogs (dowels) D3e and D3f are provided, and free side dogs (dowels) D3a and D3b corresponding to the slide side dogs D3e and D3f are provided on the free side gears 49a and 49b which are positioned adjacent the slide side dogs D3e and D3f, respectively.

The slide side dogs and the free side dogs engage against relative rotation with each other since the slide gears (including slide rings) and the free gears corresponding to each other are positioned adjacent each other, and the engagement is canceled by disengagement of the slide gears and the free gears from each other.

And, since each of the slide gears and a corresponding free gear engage against relative rotation through a corresponding dog, power transmission selectively using some shift gear train is carried out between the main shaft 28 and the countershaft 29. In a state in which engagement between all of the slide gears and the free gears is canceled (as illustrated in FIG. 5), power transmission between the shafts 28 and 29 is disabled. This state is a neutral state of the transmission 47.

The ECU 42 (an example of which is shown in FIG. 3) controls operation of the twin clutch type transmission 23 and the gear shift apparatus 41 based not only on information of the sensors but also on information from an opening sensor TS of the throttle valve of the throttle body 16, a retraction sensor SS for detecting a retracted state of a side stand, a wheel speed sensor WS of the front wheel 2, a mode switch SW1 disposed on the steering handle bar 4a or the like, a gear select switch SW2, a neutral-drive changeover switch SW3 and so forth to vary the shift change stage (shift position) of the transmission 47. Further, the sensor signals are transmitted also to an EFI-ECU 42a which controls a fuel injection system.

As the shift change mode to be selected by the mode switch SW1, a full automatic mode in which the shift change stage of the transmission 47 is changed automatically based on vehicle information such as the vehicle speed (wheel speed), the engine speed and so forth and a semi automatic mode in which the shift change stage of the transmission 47 can be changed over only by an operation of the gear select switch SW2 based on a will of the driver are available. The shift change mode and the shift change stage at present are displayed, for example, on a meter apparatus M provided in the proximity of the steering handle bar 4a. Further, the transmission 47 can be changed over between a state in which power transmission can be carried out at a predetermined shift change stage and a neutral state by an operation of the neutral-drive changeover switch SW3.

Referring to the example of FIG. 4, an engine speed sensor SE3 is disposed in the proximity of the primary driven gear 58. Meanwhile, an inner shaft speed sensor SE10 for detecting the speed of rotation of the inner shaft 43 is disposed in the proximity of the driving gear 48a, and an outer shaft speed sensor SE11 for detecting the speed of rotation of the outer shaft 44 is disposed in the proximity of the driving gear 48b. Further, a countershaft speed sensor SE19 is disposed in the proximity of the countershaft 29. Signals of the sensors are transmitted to the ECU 42 and the EFI-ECU 42a. It is to be noted that the speed sensors described can be disposed not at the respective positions in the present embodiment but at various positions at which desired information can be detected.

As shown in FIG. 5, in the twin clutch 26, the first clutch 51a connected to the shift gear trains for the odd-numbered shift change stages is disposed on the right side (outer side in the vehicle widthwise direction) in the clutch case 25 while the second clutch 51b which is connected to the shift gear trains for the even-numbered shift change stages is disposed on the left side (inner side in the vehicle widthwise direction) in the clutch case 25. Each of the clutches 51a and 51b is a wet multiple disk type clutch having a plurality of clutch plates (clutch disks 61a and 61b and clutch plates 66a and 66b) overlapping alternately in the axial direction.

Each of the first and second clutches 51a and 51b is a hydraulic type clutch wherein pressure plates 52a and 52b are displaced in the axial direction by oil pressure supplied from the outside to obtain predetermined engaging force. Each of the first and second clutches 51a and 51b includes a return spring 53a or 53b for biasing the pressure plate 52a or 52b to a clutch disengagement side, the engagement side hydraulic chamber 54a or 54b for applying pressing force toward the clutch engagement side to the pressure plate 52a or 52b, and the disengagement side hydraulic chamber 55a or 55b for applying pressing force toward the clutch disengagement side to the pressure plate 52a or 52b to assist returning movement of the pressure plate 52a or 52b.

A comparatively low oil pressure is normally supplied from the main oil pump to the disengagement side hydraulic chambers 55a and 55b while a comparatively high oil pressure from the oil pressure supplying apparatus 46 (clutch oil pump 32) is selectively and individually supplied to the engagement side hydraulic chambers 54a and 54b.

The first and second clutches 51a and 51b share the single clutch outer 56 and are configured with a substantially uniform diameter. The clutch outer 56 has a bottomed cylindrical shape which is open rightwardly and is supported at a bottomed central portion thereof for relative rotation at a leftward and rightward intermediate portion of the outer shaft 44. A clutch center 57a for the first clutch 51a is disposed on the left inner side of the clutch outer 56 while a clutch center 57b for the second clutch 51b is disposed on the right inner side of the clutch outer 56. The clutch center 57b is supported for integral rotation at a right end portion of the outer shaft 44.

The primary driven gear 58 is attached to the left side of a bottom portion of the clutch outer 56 through a spring damper 59, and the primary driving gear 58a of the crankshaft 21 meshes with the primary driven gear 58. To the clutch outer 56, rotational power of the crankshaft 21 is inputted through the spring damper 59. The clutch outer 56 rotates separately from the main shaft 28 upon rotation of the crankshaft 21.

On the left side of the primary driven gear 58 on the clutch outer 56, a driving sprocket wheel 56b for driving the oil pumps is provided for integral rotation. On an inner periphery of the right side of the clutch outer 56, a plurality of clutch plates 61a for the first clutch 51a are provided for integral rotation. Meanwhile, on an inner periphery of the left side of the clutch outer 56, a plurality of clutch plates 61b for the second clutch 51b are supported for integral rotation.

A plurality of engaging grooves are formed along the axial direction on an outer periphery of the clutch outer 56, and a plurality of engaging projections corresponding to the engaging grooves are formed on an inner periphery of the clutch plates 61a and 61b. And, the engaging projections are engaged against relative rotation with the engaging grooves to support the clutch plates 61a and 61b for integral rotation on the clutch outer 56.

An inner wall portion 65a is provided on a left side flange portion 64a of the clutch center 57a of the first clutch 51a such that it is erected rightwardly, and a plurality of clutch disks (friction plates) 66a are supported for integral rotation on an outer periphery of the inner wall portion 65a.

A plurality of engaging grooves are formed along the axial direction on an outer periphery of the clutch center 57a while a plurality of engaging projections corresponding to the engaging grooves are formed on an inner periphery of the clutch disks 66a. And, the engaging projections are engaged against rotation with the engaging grooves to support the clutch disks 66a for integral rotation with the clutch center 57a.

The pressure plate 52a is disposed in an opposing relationship rightwardly of the flange portion 64a, and the clutch plates 61a and the clutch disks 66a are disposed in a layered state, in which they overlap alternately in the axial direction, between the outer periphery side of the pressure plate 52a and the outer periphery side of the flange portion 64a.

Between the inner periphery side of the pressure plate 52a and the inner periphery side of the flange portion 64a, the disengagement side hydraulic chamber 55a is formed and the return spring 53a for biasing the pressure plate 52a rightwardly (in the direction in which the pressure plate 52a is spaced away from the flange portion 64a, clutch disengagement side) is disposed. Rightwardly of the inner periphery side of the pressure plate 52a, a support flange portion 67a provided on the outer periphery of the central cylindrical portion 62a on the right side of the clutch center 57a is disposed oppositely, and between the support flange portion 67a and the inner periphery side of the pressure plate 52a, the engagement side hydraulic chamber 54a is formed and the return spring 53a is disposed.

Meanwhile, an inner wall portion 65b is provided on a flange portion 64b on the left side of the clutch center 57b of the second clutch 51b such that it is erected rightwardly, and a plurality of clutch disks 66b are supported for integral rotation on the outer periphery of the inner wall portion 65b.

A plurality of engaging grooves are formed along the axial direction on the outer periphery of the clutch center 57b while a plurality of engaging projections corresponding to the engaging grooves are formed on the inner periphery of the clutch disks 66b. Each of the engaging projections engages each of the engaging grooves with not relatively rotatable state, then each of the clutch disks 66b is supported to the clutch center 57b with integrally rotatable state.

The pressure plate 52b is disposed in an opposing relationship rightwardly of the flange portion 64b, and between the outer periphery side of the pressure plate 52b and the outer periphery side of the flange portion 64b, the clutch plates 61b and the clutch disks 66b are disposed in a layered state in which they overlap alternately in the axial direction.

Between the inner periphery side of the pressure plate 52b and the inner periphery side of the flange portion 64b, the disengagement side hydraulic chamber 55b is formed and the return spring 53b for biasing the pressure plate 52b rightwardly (in the direction in which the central cylindrical portion 62b is displaced from the flange portion 64b, clutch disengagement side) is disposed. Rightwardly of the inner periphery side of the pressure plate 52b, a support flange portion 67b provided on the outer periphery of the right side central cylindrical portion 62b of the clutch center 57b is disposed in an opposing relationship, and the engagement side hydraulic chamber 54b is formed and the return spring 53b is disposed between the support flange portion 67b and the inner periphery side of the pressure plate 52b.

The first supply oil path 92a, second supply oil path 92b and an in-cover main supply oil path 71a are provided in a clutch cover 69 which configures the right side of the clutch case 25. Meanwhile, oil paths individually communicating with the oil paths 92a, 92b and 71a are formed suitably in the right hollow portion 43a of the inner shaft 43.

By the configuration described above, oil pressure from the clutch oil pump 32 can be supplied to the engagement side hydraulic chamber 54b of the second clutch 51b through the first supply oil path 92a and so forth. Further, oil pressure from the main oil pump can be supplied to the disengagement side hydraulic chamber 55a of the first clutch 51a through the in-cover main supply oil path 71a and so forth. Furthermore, oil pressure from the clutch oil pump 32 can be supplied to the engagement side hydraulic chamber 54a of the first clutch 51a through the second supply oil path 92b and so forth, and oil pressure from the main oil pump can be supplied to the disengagement side hydraulic chamber 55b of the second clutch 51b through the main supply oil path 71 and so forth.

In a state in which the engine stops (stopping state of the oil pumps), the pressure plates 52a and 52b of the first and second clutches 51a and 51b are displaced rightwardly by the biasing force of the return springs 53a and 53b to establish a clutch disengagement state in which the frictional engagement of the clutch plates 61a and 61b and the clutch disks 66a and 66b is canceled. Also in an operating state of the engine, in a state in which supply of oil pressure from the oil pressure supplying apparatus 46 stops, the biasing force of the return springs 53a and 53b and oil pressure of the disengagement side hydraulic chambers 55a and 55b act upon the pressure plates 52a and 52b to establish the clutch disengagement state similarly as described above. In particular, the twin clutch 26 according to the present embodiment is of the "normally open type" in which it exhibits a disengagement state in which no control is carried out.

In the first clutch 51a, in a state in which the engine is operating and a comparatively high oil pressure is supplied from the oil pressure supplying apparatus 46 to the engagement side hydraulic chamber 54a, the pressure plate 52a moves leftwardly (to the flange portion 64a side, clutch engagement side) against the oil pressure of the disengagement side hydraulic chamber 55a and the biasing force of the return spring 53a and the clutch plates 61a and the clutch disks 66a are sandwiched and frictionally engage with each other to establish a clutch engagement state in which torque can be transmitted between the clutch outer 56 and the clutch center 57a.

Meanwhile, in the second clutch 51b, in a state in which the engine is operating and a comparatively high oil pressure is supplied from the oil pressure supplying apparatus 46 to the engagement side hydraulic chamber 54b, the pressure plate 52b moves leftwardly (to the flange portion 64b side, clutch engagement side) against the oil pressure of the disengagement side hydraulic chamber 55b and the biasing force of the return spring 53b and the clutch plates 61b and the clutch disks 66b are sandwiched and frictionally engage with each other to establish a clutch engagement state in which torque can be transmitted between the clutch outer 56 and the clutch center 57b.

Then, if the oil pressure supply to the engagement side hydraulic chambers 54a and 54b stops in the clutch engagement state of the first and second clutches 51a and 51b, then the pressure plates 52a and 52b are displaced rightwardly by the oil pressure of the disengagement side hydraulic chambers 55a and 55b and the biasing force of the return springs 53a and 53b to cancel the frictional engagement of the clutch plates 61a and 61b and the clutch disks 66a and 66b thereby to establish a clutch disengagement state in which torque transmission between the clutch outer 56 and the clutch centers 57a and 57b is disabled.

Engine oil supplied to the disengagement side hydraulic chambers 55a and 55b of the first and second clutches 51a and 51b is introduced to the outside of the hydraulic chambers through oil paths formed suitably in the inner wall portions 65a and 65b and is suitably supplied to the clutch plates 61a and 61b and the clutch disks 66a and 66b on the outer periphery of the inner wall portions 65a and 65b. By allowing the operating oil in the disengagement side hydraulic chamber 55a or 55b to escape in this manner, the oil pressure in the disengagement side hydraulic chambers 55a and 55b is kept in a predetermined low pressure state and besides the lubricating property and the cooling property of the clutch plates 61a and 61b and the clutch disks 66a and 66b of the first and second clutches 51a and 51b which are in a disengaged state are improved.

In the twin clutch type transmission 23 described above, also after starting of the engine of the motorcycle 1, if it is decided that the motorcycle 1 is in a stopping state from the fact that the side stand is erected uprightly or the like, then both of the first and second clutches 51a and 51b are kept in the clutch disengaged state. And, for example, if the side stand is retracted or any of the switches SW1, SW2 and SW3 is operated, then the transmission 47 changes its state from the neutral state to the first speed state in which power transmission can be carried out using the first speed gears (starting gears, shift gear train 45a) as preparations for starting of the motorcycle 1. Then, for example, as the engine speed rises from this state, the first clutch 51a is placed into a clutch engagement state through a partial clutch engagement state to cause the motorcycle 1 to start.

Upon traveling of the motorcycle 1, only one of the first and second clutches 51a and 51b which corresponds to the current shift position exhibits an engagement state while the other of the first and second clutches 51a and 51b remains in the disengagement state. Consequently, power transmission through one of the inner and outer shafts 43 and 44 and one of the shift gear trains 45a to 45f is carried out. At this time, the ECU 42 controls operation of the twin clutch type transmission 23 based on the vehicle information to create a state in which power transmission can be carried out using a shift gear train corresponding to a next shift position. Hereinafter, the operation in which this state is produced is called "pre-shift change."

In particular, if the current shift position (shift change stage) is, for example, an odd-numbered stage (or even-numbered stage), then since the next shift position is an even-numbered stage (or odd-numbered stage), pre-shift change is executed in order to allow power transmission using the shift gear pair of the even-numbered stage (or odd-numbered stage). At this time, although the first clutch 51a is in an engaged state, since the second clutch 51b (or first clutch 51a) is in the disengaged state, the engine output power is not transmitted to the outer shaft 44 (or inner shaft 43) and the shift gear train of the even-numbered stage (or odd-numbered stage).

Thereafter, when the ECU 42 decides that a shift timing comes, then if it only places the first clutch 51a (or second clutch 51b) into a disengaged state and places the second clutch 51b (or first clutch 51a) into an engaged state, then the power transmission is changed over such that the shift gear train corresponding to the next shift position selected in advance is used. Consequently, rapid and smooth shift change can be carried out which does not give rise to a time lag upon shift change or intermission of power transmission.

Further, the twin clutch type transmission 23 is configured such that, upon ordinary traveling in which the shift change stage is fixed, very low oil pressure as a "pre-load" is supplied into the engagement side hydraulic chamber of the clutch (51a or 51b) which is in a disengaged state and the clutch is operated by a very small amount to the clutch engagement side. This very low oil pressure is oil pressure higher than a minimum oil pressure necessary to eliminate a mechanical play of the clutch, or in other words, oil pressure higher than that which corresponds to the force of the return spring of the clutch.

In normal traveling in which the shift change stage is fixed, in the clutch in an engaged state (engagement side clutch), the parts on the crankshaft 21 side (those parts which rotate integrally with the primary driven gear 58, for example, the clutch outer 56, clutch plates 61a or 61b and so forth) and the parts on the transmission 47 side (those parts which rotate integrally with the main shaft 28, that is, the clutch center 57a or 57b, clutch disks 66a and 66b and so forth) rotate integrally with each other. Meanwhile, upon the normal travelling, in the clutch in a disengaged state (disengagement side clutch), the parts on the crankshaft 21 side rotate with respect to the parts on the transmission 47 side which is in a stopping state.

In the clutches 51a and 51b, when driving force (torque) is not transmitted, a mechanical play (clearance) exists in the direction of rotation between the engaging grooves on the outer periphery of the clutch outer 56 and the engaging projections on the outer periphery of the clutch plates 61a and 61b and between the engaging grooves on the outer periphery of the clutch centers 57a and 57b and the engaging projections on the inner periphery of the clutch disks 66a and 66b. However, by causing the clutch which is in a disengaged state to operate by a very small amount to the clutch engagement side, very low torque is applied from the parts on the crankshaft 21 side to the parts on the transmission 47 side. Consequently, the play in the direction of rotation can be eliminated, and generation of sound upon normal traveling based on the play can be suppressed.

And, the shift change controlling apparatus according to the present embodiment is characterized in that, in addition to the control of eliminating the play by application of the preload described hereinabove, the following four control schemes can be carried out:

(1) control wherein an actual engagement state of the clutch is detected based on a variation of an output of the clutch oil pressure sensor to allow accurate oil pressure control within a partial clutch engagement region without using a clutch stroke sensor or the like;

(2) control wherein a clutch slip state upon passing of the clutch is detected based on a variation of the speed ratio between the crankshaft and the countershaft to carry out appropriate clutch engagement;

(3) control wherein, upon changeover of the clutch upon a shift changeover operation, if the shift change is not completed even if a predetermined period of time elapses, the clutch is engaged compulsorily; and (4) control wherein, in order to prevent generation of hammering upon pre-shift change, an appropriate waiting time period after an operation for removing the pre-load is started until driving of the shift gears is started is set.

In the following, operation of the control schemes (1) to (4) described above is described with reference to the drawings.

Figure 7:
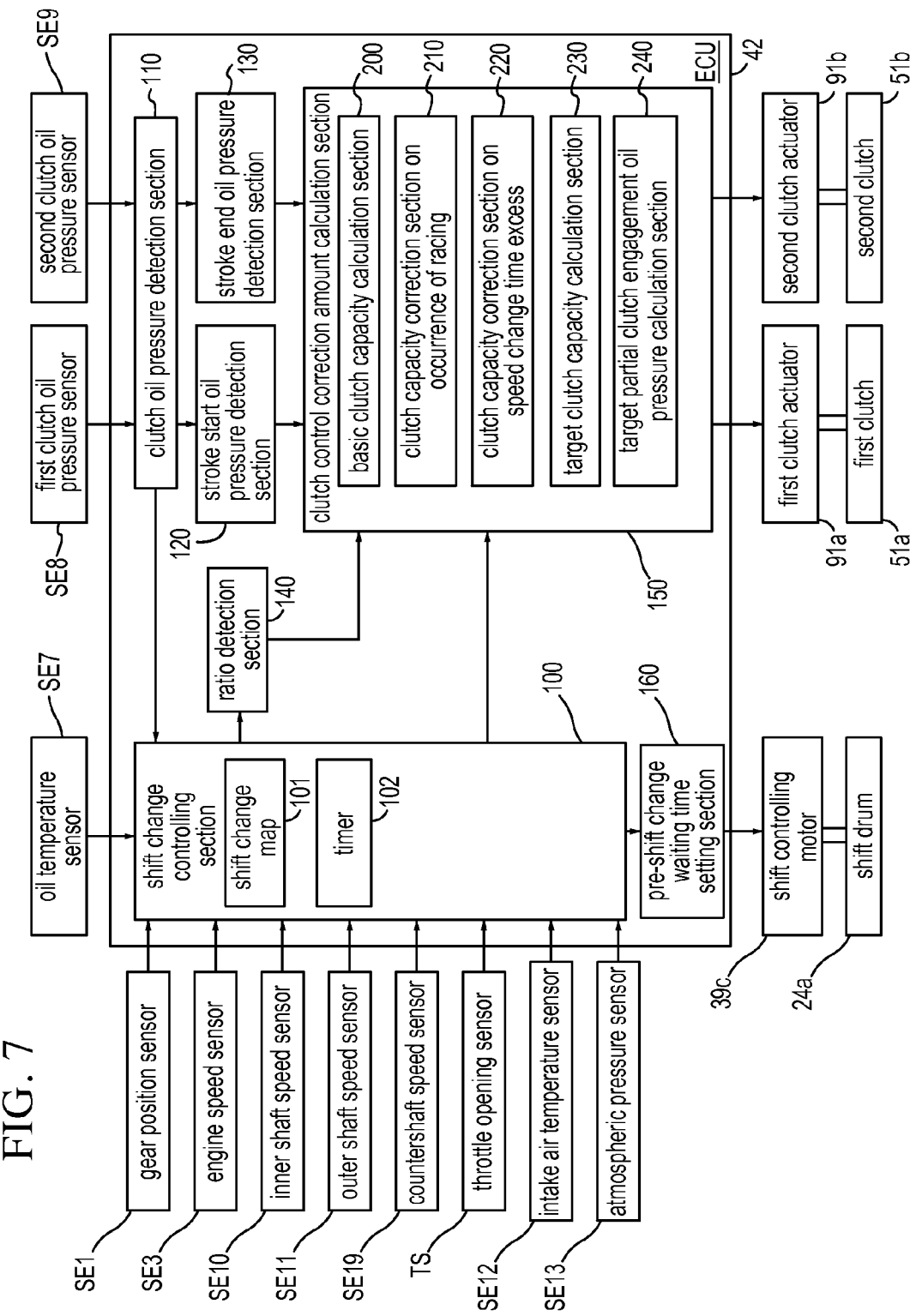
FIG. 7 is a block diagram showing a configuration of an ECU and peripheral apparatus.

FIG. 7 is a block diagram showing an example of a configuration of the ECU 42 as a shift change controlling apparatus according to an embodiment of the present invention and peripheral apparatus. Like reference symbols to those described hereinabove denote like or equivalent elements. The ECU 42 includes a shift change controlling section 100, a clutch oil pressure detection section 110, a stroke start oil pressure detection section 120, a stroke end oil pressure detection section 130, a ratio detection section 140, a clutch control correction amount calculation section 150 and a pre-shift change waiting time setting section 160. The shift change controlling section 100 includes a shift change map 101 and a timer 102. The timer 102 can carry out not only calculation of an engine speed and so forth but also various time periods such as a period of time relating to a shift change operation. Further, the clutch control correction amount calculation section 150 includes a basic clutch capacity calculation section 200, a clutch capacity correction section 210 on occurrence of racing, a clutch capacity correction section 220 on shift change time excess, a target clutch capacity calculation section 230 and a target partial clutch engagement oil pressure calculation section 240.

To the shift change controlling section 100, signals from the oil temperature sensor SE7, gear position sensor SE1, engine speed sensor SE3, inner shaft speed sensor SE10, outer shaft speed sensor SE11, countershaft speed sensor SE19, and throttle opening sensor TS as well as an intake air temperature sensor SE12 and an atmospheric pressure sensor SE13 are inputted. Further, signals from the first clutch oil pressure sensor SE8 and the second clutch oil pressure sensor SE9 are inputted to the shift change controlling section 100 through the clutch oil pressure detection section 110.

Upon normal traveling of the vehicle, the shift change controlling section 100 drives the shift controlling motor 39c, first clutch actuator 91a and second clutch actuator 91b in accordance with the shift change map 101 formed from a three-dimensional map or the like based on information of the gear position sensor SE1, engine speed sensor SE3, throttle opening sensor TS and vehicle speed to carry out a shift change operation. On the other hand, upon automatic shift change control in accordance with the shift change map 101 and upon semiautomatic shift change by an operation of the gear select switch SW2, the shift change controlling section 100 generates a shift change signal to carry out also detection of a shift change state such as a state in which shift change is proceeding. Here, FIG. 8 is referred to.

Figure 8:
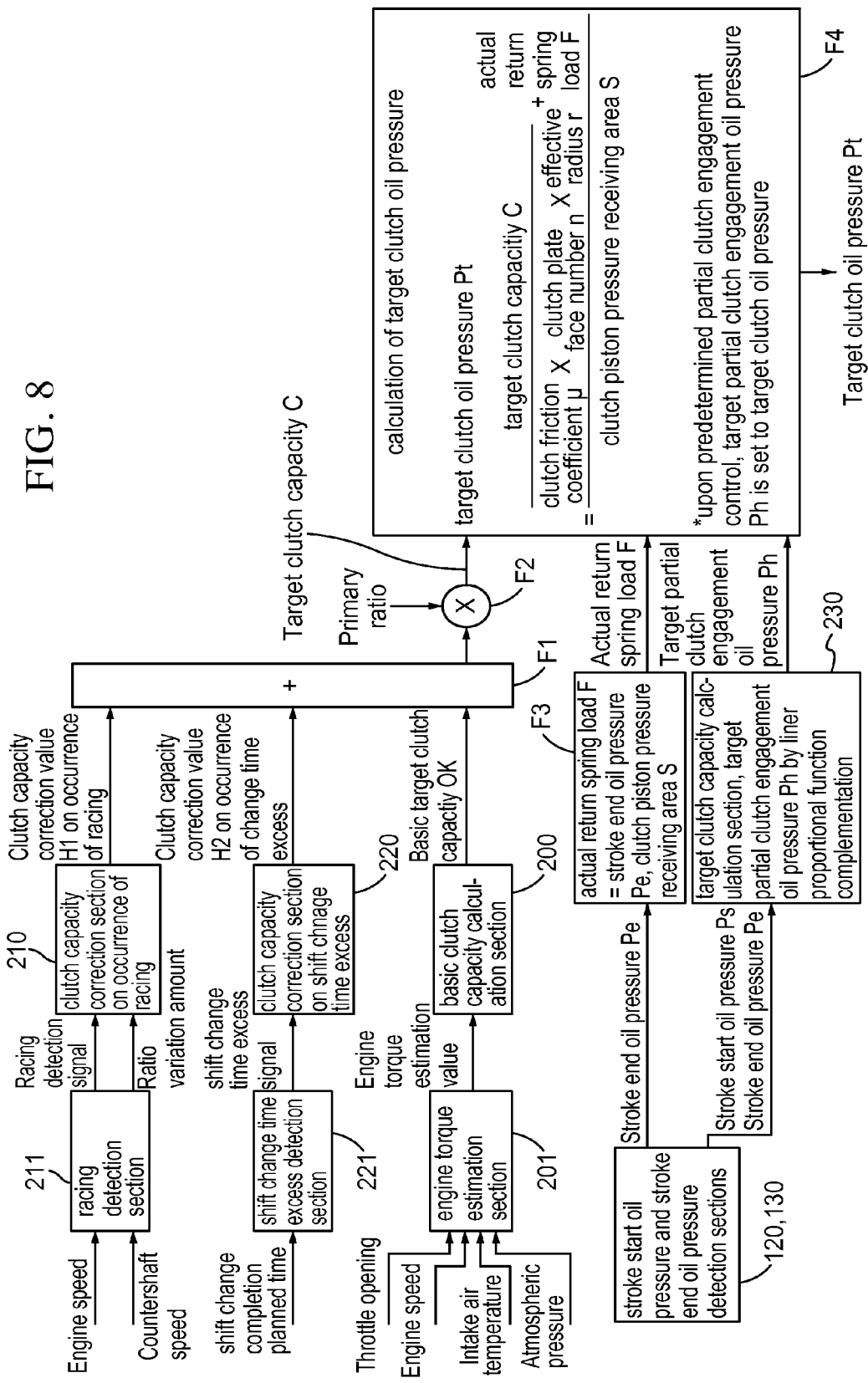
FIG. 8 is a block diagram illustrating a calculation procedure of a target clutch oil pressure.

FIG. 8 is a block diagram illustrating a calculation procedure of a target clutch oil pressure Pt. The clutch control correction amount calculation section 150 described above finally calculates the target clutch oil pressure Pt by various calculation processes and drives the first and second clutch actuators 91a and 91b so that the target clutch oil pressure Pt is supplied to the first and second clutches 51a and 51b. The target clutch oil pressure Pt is an oil pressure with which the clutch is fully placed into an engaged state and is calculated in accordance with the expression given below indicated in a procedure F4 using a target clutch capacity C and an actual return spring load F:

$Pt=((\text{target clutch capacity } C/\text{clutch friction coefficient } \mu \times \text{clutch plate face number } n \times \text{effective radius } r)+\text{actual return spring load } F)/\text{clutch piston pressure receiving area } S$.

The target clutch capacity C is calculated by multiplying a value obtained by executing correction with a clutch capacity correction value H1 on occurrence of racing and a clutch capacity correction value H2 on occurrence of shift change time excess in a procedure F1 for a basic target clutch capacity CK calculated by the basic clutch capacity calculation section 200 by a primary ratio (speed reduction ratio from the crankshaft to the main shaft) in a procedure F2.

Meanwhile, the basic target clutch capacity CK is set to torque with which the clutch can transmit rotational driving force without any slip, that is, to a value higher by an arbitrary mount α (for example, 20% of the engine torque) than engine torque being currently generated. This arbitrary mount α is a parameter which has an influence on the shift change time or the shift change feeling, and an arbitrary numerical value suitable for a situation is set. An engine torque estimation section 201 calculates an engine torque estimated value based on information such as the throttle opening, engine speed, intake air temperature, atmospheric pressure and so forth.

Further, the actual return spring load F is calculated in accordance with the following expression in a procedure F3:

$\text{actual return spring load } F = \text{stroke end oil pressure } Pe \times \text{clutch piston pressure receiving area } S$.

Here, for example, if the actual return spring load F is higher than a reference value (fixed value determined in advance based on a designed value or the like), then it is considered that such a change that the stroke amount is increased by abrasion of the clutch plates to increase the pressure amount of the return spring or the return spring (return spring 53a or 53b) is replaced by a product having higher elastic force has occurred. On the other hand, if the actual return spring load F is lower than the reference value, it is considered that the elastic force of the return spring decreases as a result of a time-dependent variation or the like. In the present embodiment, correction control which takes such a variation of the actual return spring load F as described above into consideration can be carried out by the procedures F3 and F4.

After the target clutch oil pressure Pt is determined, this is applied to a data table (not shown) which defines a relationship between the target clutch oil pressure Pt and the actuator driving current to determine a clutch control amount after correction which takes the variation of the actual return spring load F into consideration. The clutch control correction amount calculation section 150 uses the calculated actuator driving current to control driving of the first clutch actuator 91a and the second clutch actuator 91b. Consequently, even if a state variation of the clutch is caused by a characteristic variation of the return spring or the like, variation of the traveling feeling can be prevented.

Further, if the calculation process of a clutch control amount based on the actual return spring load F is executed upon complete survey or the like, then even if a return spring has a dispersion in accuracy and so forth, all vehicles can be shipped from a factory while they are in a state in which similar clutch setting is carried out for all vehicles. Further, if the correction control amount of the clutch exceeds a predetermined value, then it is possible to inform a driver of this using warning means formed from a warning lamp or a speaker to urge the driver to take such a countermeasure as to carry out replacement of a clutch plate or a return spring or check a driving transmission system from the clutch to the driving wheel.

The stroke end oil pressure Pe used for calculation of the actual return spring load F is detected by the stroke end oil pressure detection section 130. Further, in the present embodiment, the stroke end oil pressure Ps is detected by the stroke start oil pressure detection section 120 so that a target partial clutch engagement oil pressure Ph necessary to create an arbitrary partial clutch engagement state can be calculated separately from the target clutch oil pressure Pt. Here, a detection method of a stroke start oil pressure Ps and the stroke end oil pressure Pe is described with reference to FIG. 9.

Figure 9:
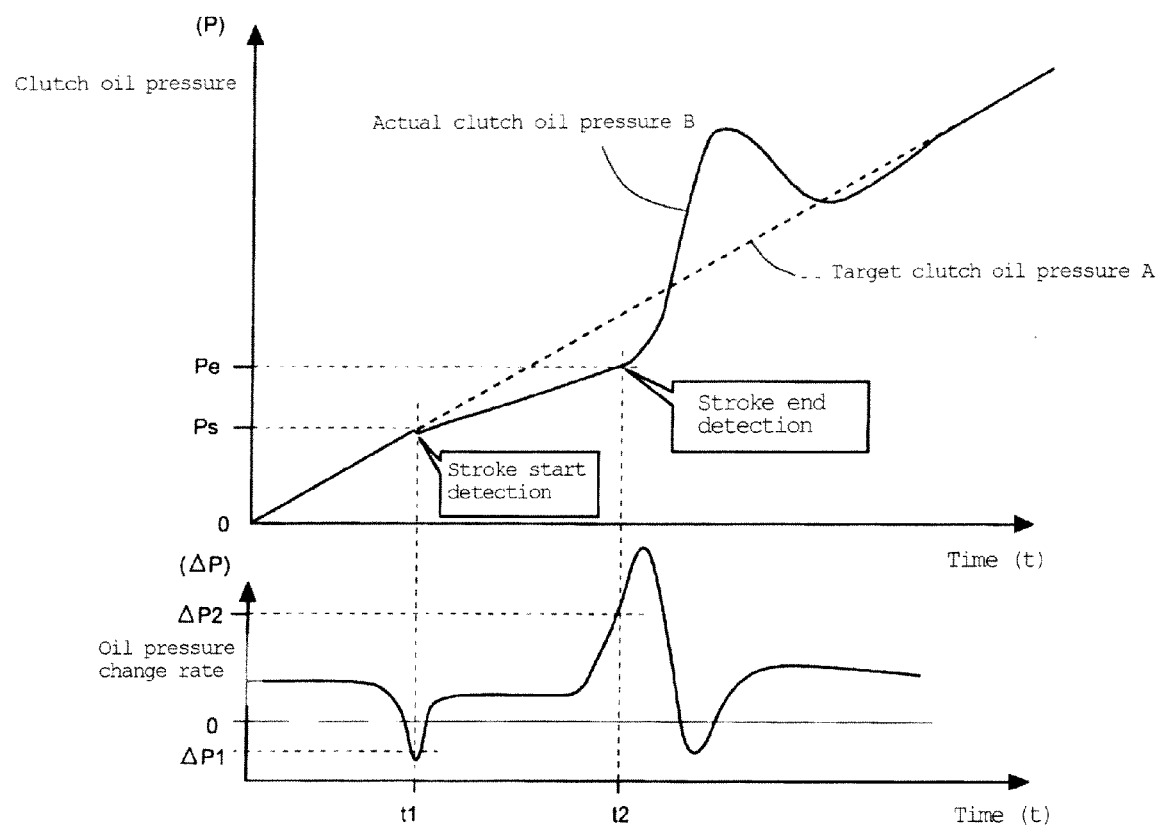
FIG. 9 is a graph illustrating a transition of a clutch oil pressure when a clutch is driven in an engaging direction.

FIG. 9 is a graph illustrating a transition of the clutch oil pressure when the clutch is driven in an engaging direction. In this graph, the target clutch oil pressure A is indicated by a broken line while an actual clutch oil pressure B detected by the clutch oil pressure detection section 110 is indicated by a solid line. As described hereinabove, the oil pressure clutch according to the present embodiment is configured such that it strokes in the engaging direction against the biasing force of the return spring by supplying oil pressure. Therefore, even if driving of the clutch actuator is started at time t=0 in order to engage the clutch, the stroke is not started immediately, but the actual clutch oil pressure B rises along the target clutch oil pressure A.

Then at time t1, the actual clutch oil pressure B becomes higher than the biasing force of the return spring and the clutch begins to stroke, and together with this, the rising degree of the actual clutch oil pressure B changes to a gentle rise after it is deflected a little toward the negative direction. Then at time t2, the clutch plates are brought into engagement and the clutch reaches a position at which it cannot stroke any more (stroke end position), and consequently, the actual clutch oil pressure B rises steeply. Thereafter, the actual clutch oil pressure B converges to the target clutch oil pressure A after it exceeds the target clutch oil pressure A once. By observing the variation of the actual clutch oil pressure B in this manner, it can be estimated and detected that the clutch reaches the stroke start position and the stroke end position.

In the present embodiment, a variation value is determined from a differential value of the actual clutch oil pressure B, and when the variation amount exceeds a negative predetermined value $\Delta P1$ determined in advance (becomes smaller than $\Delta P1$), it is decided that the clutch has started its stroke. On the other hand, when the variation amount exceeds a positive predetermined value $\Delta P2$ determined in advance, it is decided that the clutch has reached the stroke end position. In this graph, since the variation amount of the actual oil pressure exceeds the negative predetermined value $\Delta P1$ at time t1, the actual clutch oil pressure Ps at time t1 is detected as the oil pressure value at the start of the stroke, and besides since the variation amount of the actual clutch oil pressure B exceeds the positive predetermined value $\Delta P2$ (becomes higher than $\Delta P2$) at time t2, the actual clutch oil pressure Pe at time t2 is detected as the oil pressure value at the end of the stroke.

As described above, the twin clutch 26 is configured such that, when oil pressure is supplied to the engagement side hydraulic chamber, the pressure plates 52a and 52b are slidably moved in the clutch engaging direction against the biasing force of the return springs 53a and 53b. Accordingly, if the stroke amount until the clutch plates are brought into contact with each other increases, for example, by abrasion of the clutch plates or the return spring is exchanged for a product having higher elastic force, then the load necessary for the clutch plates to be brought into contact with each other increases. If such a change as just described occurs, then if the clutch is driven so as to generate oil pressure equal to that before the change, then the time required to establish an engaged state after the driving of the clutch may become long or the clutch torque capacity may become excessively great or small, resulting in the possibility that the traveling feeling upon starting or upon shift change may vary.

Therefore, in the present embodiment, the load is detected at a point of time at which the clutch plates are brought into contact with each other or at which the clutch reaches the "stroke end position" at which it cannot stroke any more do calculate the control correction value at the stroke end position.

Furthermore, where an individual difference, a dispersion upon assembly or the like of a return spring is involved, even if the stroke amount in a partial clutch engagement region is equal, a difference appears in the torque to be transmitted in the partial clutch engagement state. In the present embodiment, not only the load at the stroke end position but also the load at a point of time at which the clutch reaches the "stroke start position" at which the stroke is started are detected to make it possible to detect the control correction amount in the partial clutch engagement state. Here, a method of correcting the control amount in the partial clutch engagement region using the stroke start oil pressure Ps and the stroke end oil pressure Pe is described with reference to FIG. 10 is described.

Figure 10:
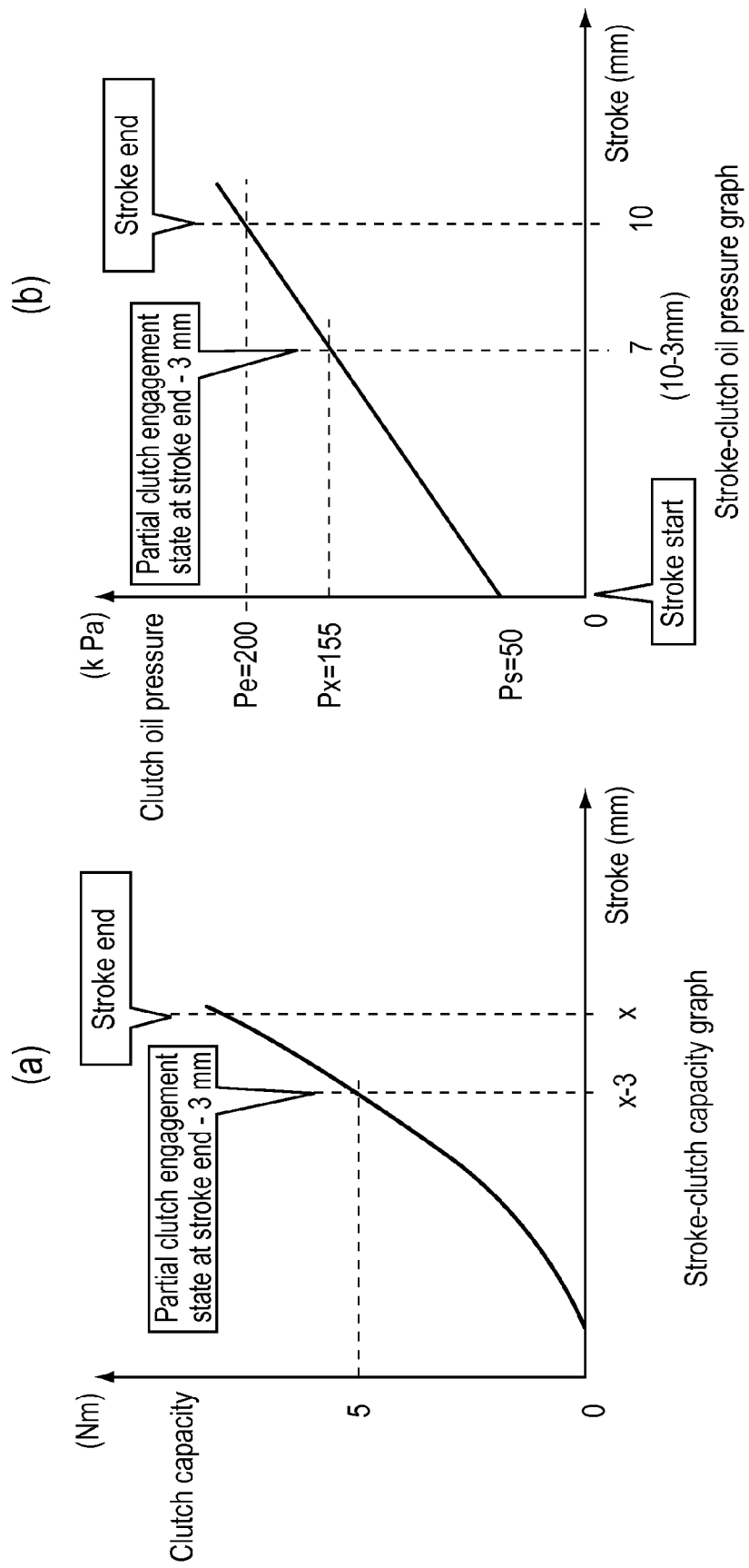
FIG. 10 is a stroke-clutch capacity graph and a stroke-clutch oil pressure graph.

FIG. 10 shows a stroke-clutch capacity graph (a) and a stroke-clutch oil pressure graph (b). The stroke-clutch capacity graph (a) indicates a relationship between the clutch stroke, which relies upon the spring characteristic of the return springs 53a and 53b, and the clutch capacity. Here, it can be recognized that, where it is desired to set the clutch capacity in a predetermined partial clutch engagement state to 5 Nm, the stroke amount of the clutch should be set to a value within 3 mm of the stroke end (full stroke position)×mm.

Now, the stroke-clutch oil pressure graph (b) approximately illustrates a relationship between the supply oil pressure and the stroke of the clutch based on the stroke start oil pressure Ps and the stroke end oil pressure Pe described hereinabove. By carrying out linear complementation in accordance with this graph, where the stroke amount at the stroke end is 10 mm and the stroke start oil pressure Ps is 50 kPa while the stroke end oil pressure Pe is 200 kPa, the clutch oil pressure Px at the stroke of 7 mm within 3 mm of the stroke end is found. The clutch oil pressure Px corresponds to a target partial clutch engagement oil pressure Ph necessary to cause the target clutch capacity of 5 Nm to be produced and is calculated in accordance with the following expression:

target partial clutch engagement oil pressure
$Ph$=stroke start oil pressure $Ps$+(stroke end oil pressure $Pe$−stroke start oil pressure $Ps$)×target partial clutch engagement stroke)/clutch stroke)
=50+((200−50)×7/10)=155 (kPa)

The calculated target partial clutch engagement oil pressure Ph is applied in place of the target clutch oil pressure Pt where the clutch capacity in a predetermined partial clutch engagement stage is to be set (refer to the procedure F4 of FIG. 8).

Figure 11:
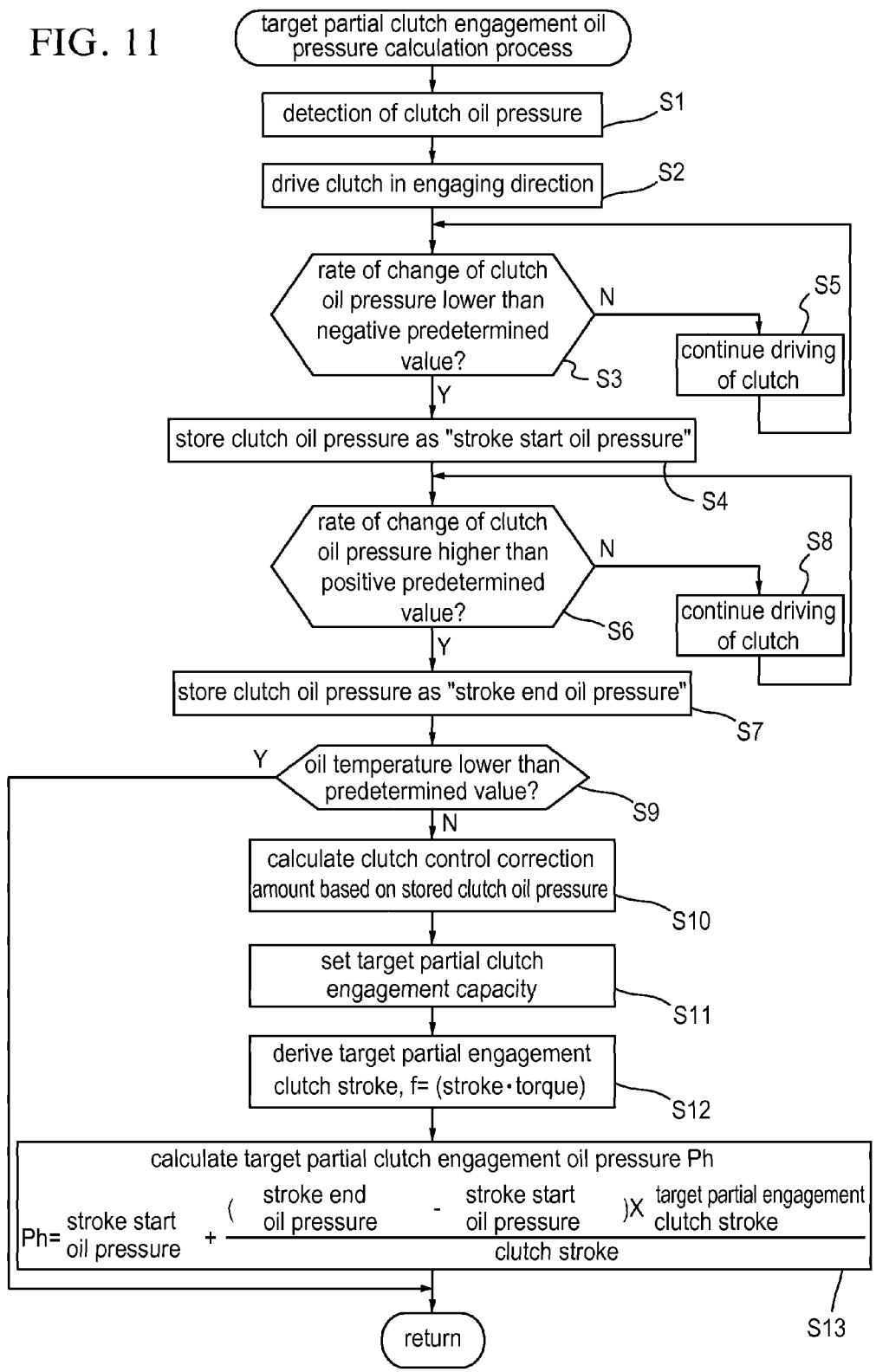
FIG. 11 is a flow chart illustrating a procedure of calculating a target partial clutch engagement oil pressure.

FIG. 11 is a flow chart illustrating a procedure of calculating the target partial clutch engagement oil pressure Ph. First at step S1, the clutch oil pressure detection section 110 (refer to FIG. 7) starts detection of the clutch oil pressure. At subsequent step S2, the clutch on the side on which calculation of the target partial clutch engagement oil pressure Ph is to be executed is driven in the engaging direction. The calculation process of the target partial clutch engagement oil pressure can be executed alternately for both clutches if the transmission is in the neutral state. On the other hand, where the transmission is in a state in which a predetermined gear shift number is selected including a condition in which the vehicle is traveling, the calculation process of the target partial clutch engagement oil pressure Ph can be executed for the clutch on the disengagement side.

At step S3, it is decided by the stroke start oil pressure detection section 120 (FIG. 7) whether or not the variation ratio of the clutch oil pressure is lower than a negative predetermined value $\Delta P1$. If an affirmative decision is made at step S3, then the processing advances to step S4, at which the stroke start oil pressure Ps at the current point of time is stored as a "stroke start oil pressure." Then at step S6, it is decided by the stroke end oil pressure detection section 130 (refer to FIG. 7) whether or not the variation ratio of the clutch oil pressure exceeds the positive predetermined value $\Delta P2$. If an affirmative decision is made at step S6, then the processing advances to step S7, at which the stroke end oil pressure Pe at the current point of time is stored as a "stroke end oil pressure." It is to be noted that, if a negative decision is made at step S3, then the driving of the clutch is continued at step S5, whereafter the processing returns to step S3. On the other hand, if a negative decision is made at step S6, then the driving of the clutch is continued at step S8, whereafter the processing returns to step S6.

At step S9, it is decided through the oil temperature sensor SE7 whether or not the oil temperature of the operating oil of the clutch is lower than a predetermined value (for example, 50 degrees). This decision is carried out because the oil temperature has a close relationship to the variation of the viscosity of the operating oil. In the present embodiment, if an affirmative decision is made at step S9, that is, if it is estimated that the oil temperature is low and the viscosity of the operating oil is high, then it is decided that this is a state which is not suitable for calculation of the clutch control correction value, and the control is ended immediately. On the other hand, if a negative decision is made at step S9, that is, if the oil temperature is higher than the predetermined value and the viscosity of the operating oil is in a state in which it is suitable for calculation of the clutch control correction amount, then the processing advances to step S10.

At step S10, the oil pressure values Ps and Pe stored at steps S4 and S7 are used to execute the calculation process illustrated in FIG. 8 to calculate the clutch control correction amount. At subsequent step S11, a target partial engagement clutch capacity is set, and at step S12, a target partial clutch engagement stroke is derived from the graph (b) shown in FIG. 10. Then at step S13, the target partial clutch engagement oil pressure calculation section 240 uses the calculation expression given hereinabove to calculate a target partial clutch engagement oil pressure Ph, thereby ending the series of control operations.

As described above, with the shift change controlling apparatus according to the present embodiment, since the stroke end position of the clutch is detected based on a variation of the actual clutch oil pressure, even if the clutch control amount at the stroke end position varies, appropriate clutch control can be executed. Further, by detecting the oil pressure at the stroke start position in addition to the oil pressure at the stroke end position, also in a partial clutch engagement state between the stroke start position and the stroke end position, appropriate clutch control can be executed.

It is to be noted that such a detection method of the stroke start position and the stroke end position as described above can be applied also to an electrically driven clutch wherein an electric motor is used as a driving source.

Figure 12:
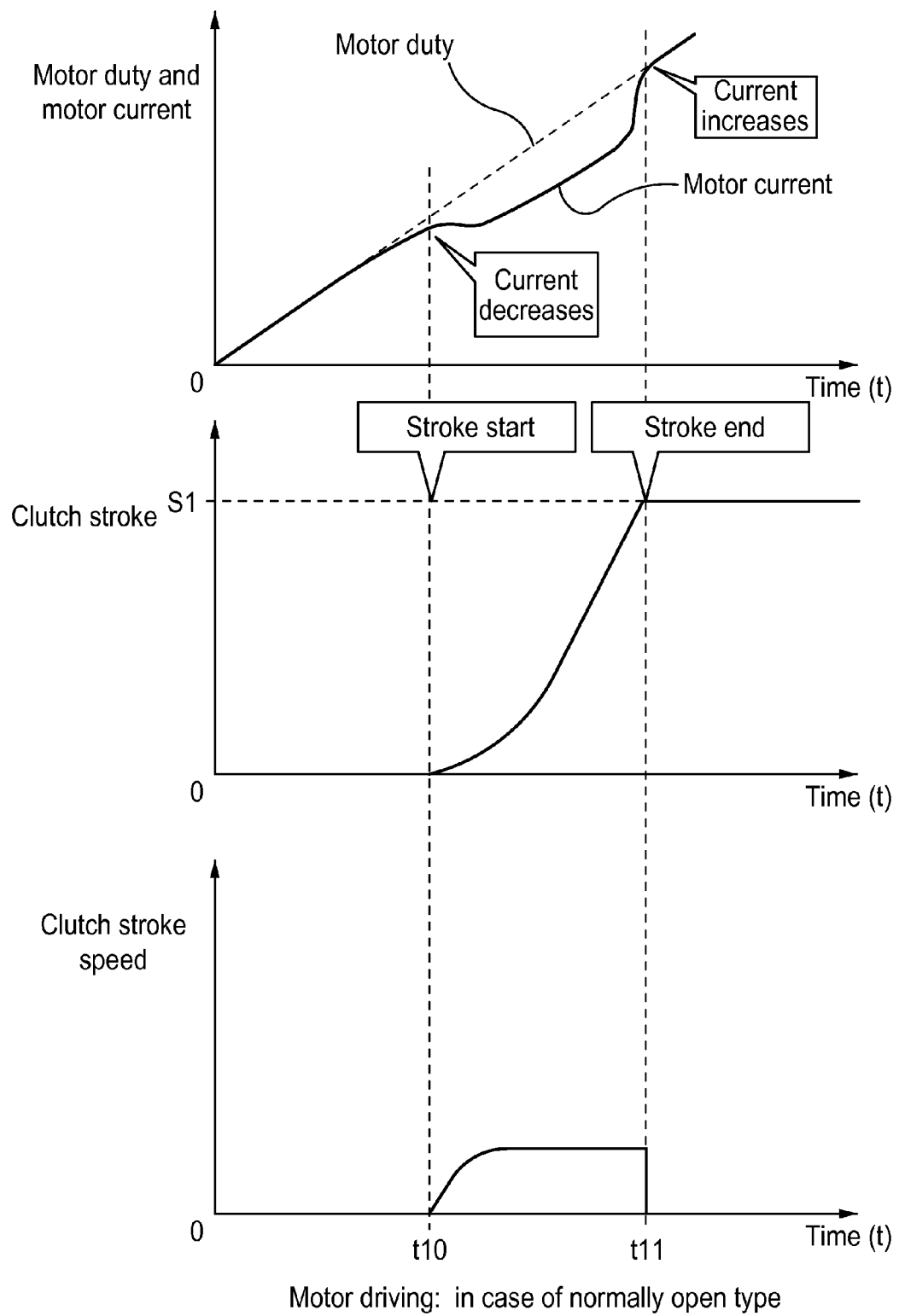
FIG. 12 is a graph illustrating a method of detecting a stroke start position and a stroke end position when a normally-open type clutch is driven by an electric motor.

FIG. 12 is a graph illustrating a method of detecting the stroke start position and the stroke end position when a normally open type clutch is driven by an electric motor. In this figure, states of the motor duty and motor current, clutch stroke and clutch stroke speed are illustrated in order from above. In the present embodiment, by observing a variation of the motor current detected by the current sensor, it is estimated and detected that the clutch reaches the stroke start position and the stroke end position.

The electrically driven clutch shown in this figure is configured such that it is placed into a disengagement state in a state in which the electric motor is not energized, and the clutch stroke at time t=0 is zero. And, after application of the motor duty indicated by a broken line in the figure is started, within the period of a predetermined period, the motor is not rotated by the biasing force of the return spring and the clutch does not start its stroke. At this time, the actual motor current value indicated by a solid line in the figure increases linearly along the motor duty.

Then, at a certain point of time approaching time t10, the motor begins to rotate. In particular, if the clutch starts its stroke, then the actual motor current decreases momentarily and then turns to a moderate increase with respect to the motor duty which increases linearly. Then, when time t11 comes, the clutch plates are brought into contact with each other and the clutch reaches the stroke end position at which the clutch stroke is S1. Consequently, the motor current increases suddenly.

In the present embodiment, the variation amount (not shown) of the motor current is determined from a differential value of the motor current, and if the variation amount exceeds a negative predetermined value determined in advance, then it can be decided that the clutch has started its stroke. Further, if the variation amount of the motor current exceeds a positive predetermined value determined in advance, then it can be determined that the clutch reaches the stroke end position.

Figure 13:
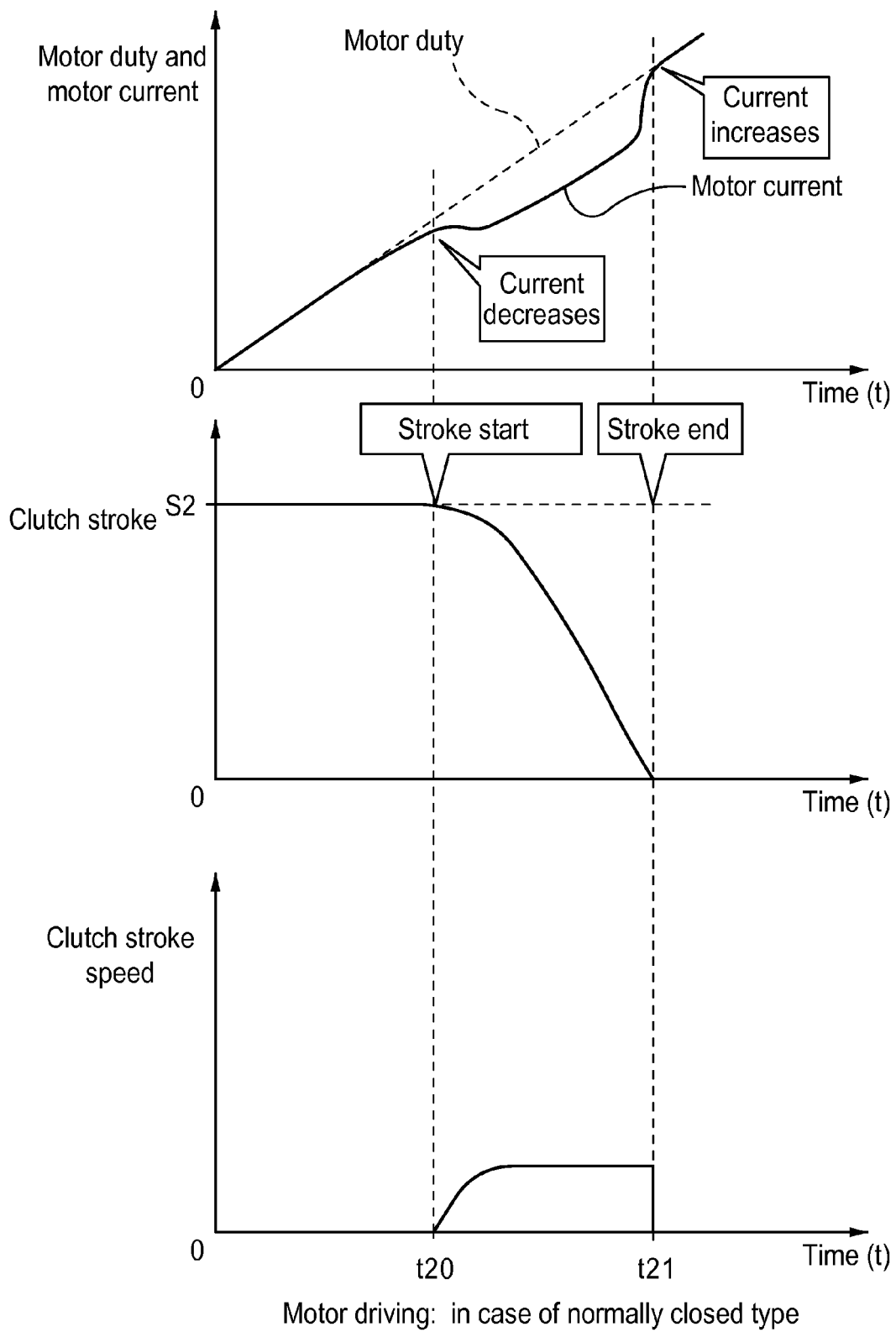
FIG. 13 is a graph illustrating a method of detecting a stroke start position and a stroke end position when a normally-closed type clutch is driven by an electric motor.

FIG. 13 is a graph illustrating a method of detecting the stroke start position and the stroke end position when a normally closed type clutch is driven by an electric motor. Also with a clutch of the normally closed type in which the clutch exhibits its full stroke, that is, its engagement state when the electric motor is not energized, the stroke start position and the stroke end position can be determined by a technique similar to that described above.

At time t=0, the clutch stroke is S2 of the full stroke state. And, after application of the motor duty indicated by a broken line in the figure is started, the motor is not rotated by the biasing force of the return spring within a predetermined period of time and the clutch does not start its stroke. At this time, the actual motor current value indicated by a solid line in the figure increases linearly along the motor duty.

Then, if the motor begins to rotate at a certain point of time approaching time t20, then the actual motor current decreases instantaneously and then turns to moderate increase with respect to the motor duty which increases linearly. Then, when time t21 comes, the clutch plates are brought into contact with each other and the clutch reaches the stroke end position at which the clutch stroke is zero, and consequently, the motor current increases suddenly.

As described above, also with an electric clutch which is driven by an electric motor, the stroke start position and the stroke end position can be detected based on the variation amount of the motor current value.

Now, the "control wherein a clutch slip state upon passing of the clutch is detected based on a variation of the speed ratio between the crankshaft and the countershaft to carry out appropriate clutch engagement" of the control scheme (2) above is described.

Figure 14:
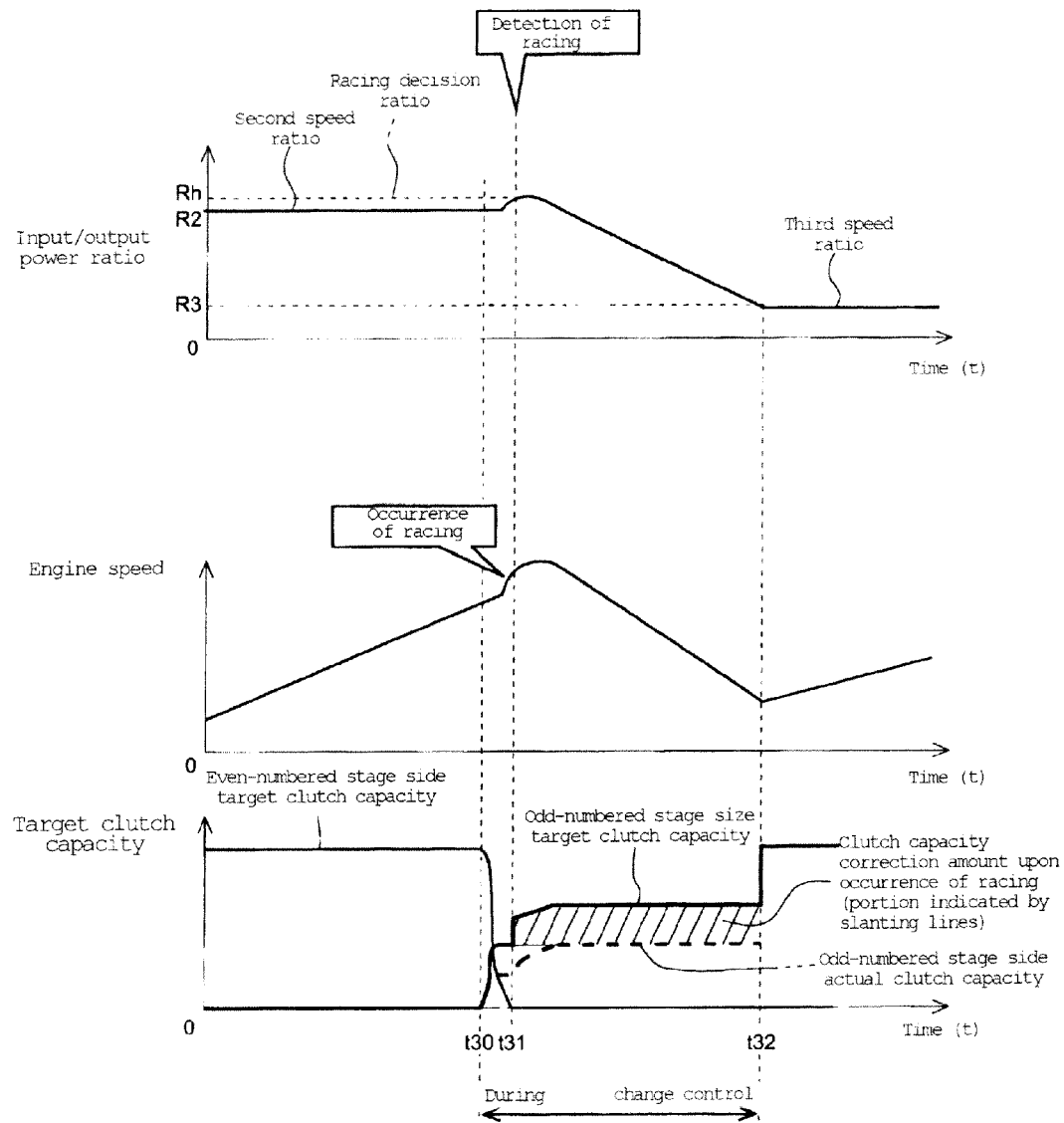
FIG. 14 is a time chart illustrating a flow of clutch control when a racing phenomenon upon shift up is detected.

FIG. 14 is a time chart illustrating an example of a flow of clutch control when a "racing phenomenon" upon a shift up is detected. Here, the "racing phenomenon" signifies a phenomenon that, after the vehicle is started, upon shift change operation during normal traveling, that is, when the engagement side clutch of the twin clutch is changed over from one side to the other side, the clutch capacity of the other side clutch becomes insufficient and a clutch slip occurs, resulting in rise of the engine speed (racing).

Here, when a clutch slip occurs upon starting of the vehicle, this can be detected focusing on the variation of the engine speed. In particular, if it is tried to detect a clutch slip in every state by focusing on the degree of increase of the engine speed, then, for example, when the shift change from the second speed to the third speed is carried out while the vehicle is being accelerated by a great amount, there is the possibility that the rise of the engine speed by the acceleration may be detected as occurrence of a clutch slip in error. In order to cope with this, the present embodiment is characterized in that detection of a racing phenomenon is carried out based on the ratio between the speed of rotation of the crankshaft and the speed of rotation of the countershaft, that is, based on a variation of the input/output power ratio.

In the example of FIG. 14, a flow of clutch control upon a shift up from the second speed to the third speed, that is, when the engagement side clutch is changed over from the second clutch to the first clutch, is illustrated. In this figure, the input/output ratio, engine speed and target clutch capacity are indicated in order from above. The input/output power ratio R is calculated by the ratio detection section 140 by dividing the engine speed detected by the engine speed sensor SE3 by the speed of rotation of the countershaft detected by the countershaft speed sensor SE19. The input/output power ratio R is a fixed value for each shift position while the clutch is engaged fully, but when the clutch is not in a fully engaged state, the input/output power ratio R assumes a value between such predetermined values. In the present embodiment, this characteristic is utilized to detect a racing phenomenon upon shift change, that is, detect a clutch slip upon shift change, by observing the variation of the input/output power ratio R.

At time t=0 to t30, the vehicle exhibits a state in which it is being accelerated with the second speed gear position selected. Within the period, if the clutch is in an engaged state, then only the engine speed varies while the input/output ratio remains equal to R2. And, at time t30, passing from the second clutch to the first clutch by a shift change operation is started. It is to be noted that, in the present embodiment, in order to suppress the torque variation upon shift change, the target clutch capacity upon passing of the clutch is set such that the second clutch is placed into a disengaged state immediately while the first clutch is changed to an engaged state stepwise.

Here, if a clutch slip does not occur during shift change control, the input/output power ratio R2 ought to start decrease rapidly toward the input/output power ratio R3 of the third speed at time t30. However, in the example of this figure, after the shift change control is started, the input/output power ratio R rises and reaches a racing decision ratio Rh at time t31. In the present embodiment, a racing phenomenon is detected from the fact that the input/output power ratio R reaches the predetermined racing decision ratio Rh during shift change control.

In the example of FIG. 14, although supply of oil pressure is started at time t30, since the actual clutch capacity of the first clutch does not reach the target clutch capacity, a clutch slip occurs, and a racing phenomenon is detected at time t31. In response to this, in the present embodiment, the clutch capacity correction amount indicated by slanting lines in the figure is added so that the actual clutch capacity of the first clutch is made coincident with the target clutch capacity. Thus, the shift change control is completed at time t32.

Figure 15:
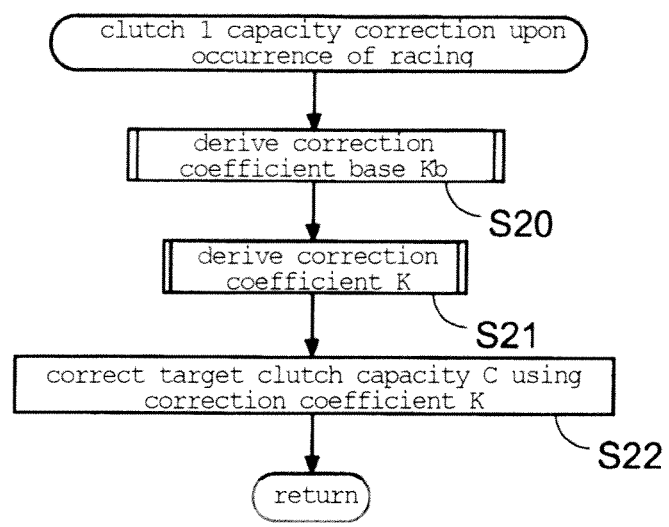
FIG. 15 is a flow chart illustrating a procedure of clutch 1 capacity correction control upon occurrence of racing according to the present embodiment.

FIG. 15 is a flow chart illustrating an example of a procedure of clutch 1 capacity correction control upon occurrence of racing according to the present embodiment. The clutch 1 capacity correction control upon occurrence of racing is executed by the clutch capacity correction section 210 on occurrence of racing (refer to FIG. 7) and is roughly configured from three steps. First at step S20, a correction coefficient base Kb is derived using a data table determined in advance. At step S21, a correction coefficient K is calculated, and at step S22, the correction coefficient K is used to correct the target clutch capacity C, thereby completing the series of processing operations. It is to be noted that, if a racing phenomenon occurs upon shift change from an odd-numbered stage gear position to an even-numbered stage gear position, then similar correction control can be carried out for the second clutch.

Referring to the example of FIG. 8, an engine speed and a countershaft speed are inputted to a racing detection section 211. The racing detection section 211 includes the ratio detection section 140 (refer to FIG. 7). And, the clutch capacity correction section 210 on occurrence of racing calculates a clutch capacity correction value H1 on occurrence of racing in response to the racing detection signal and the ratio variation amount inputted from the racing detection section 211.

Figure 16:
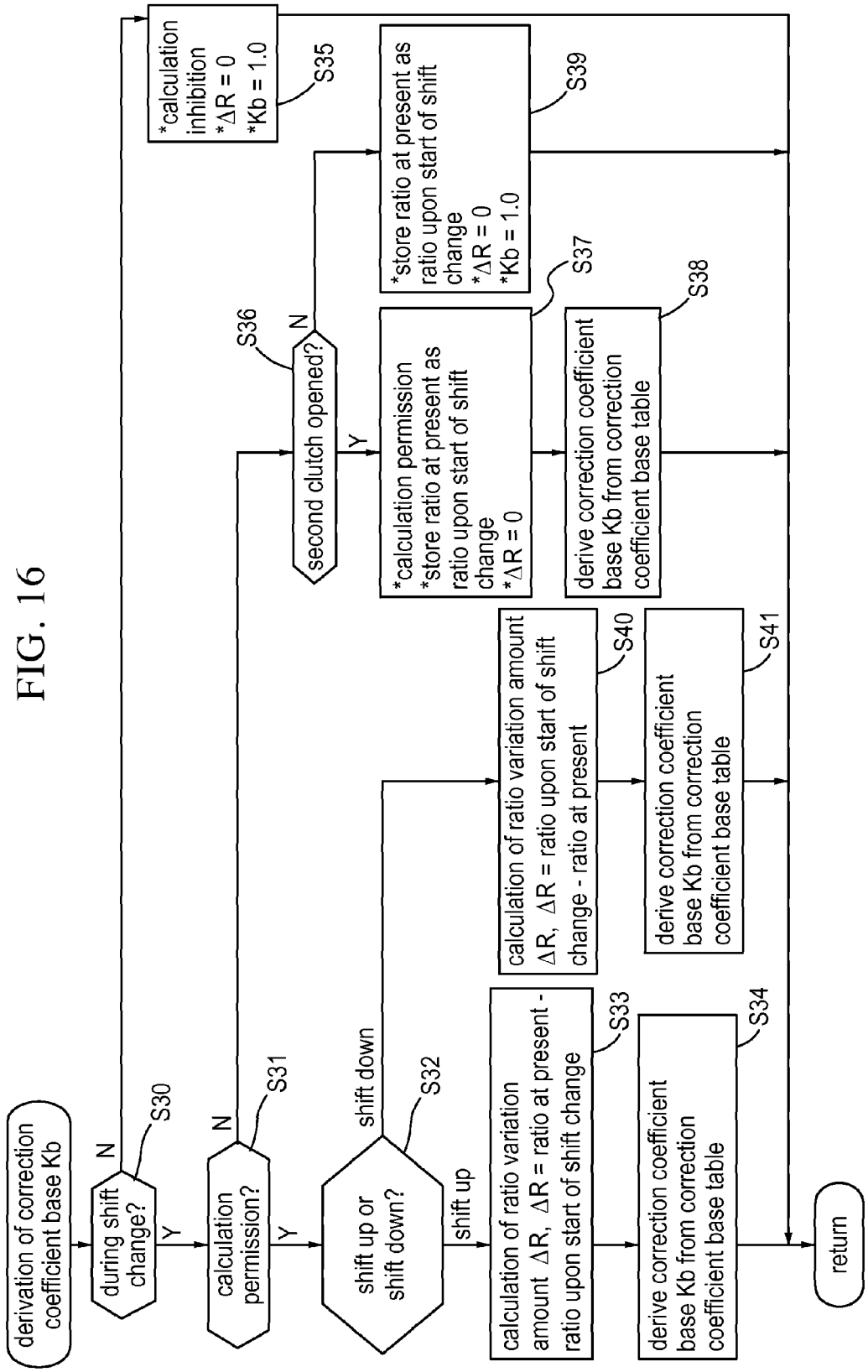
FIG. 16 is a flow chart illustrating a derivation procedure of a correction coefficient base Kb.

FIG. 16 is a flow chart illustrating an example of a deriving procedure of a correction coefficient base Kb. This flow chart corresponds to control when the shift change is carried out from an even-numbered stage gear position to an odd-numbered stage gear position by passing from the second clutch to the first clutch, for example, like a case in which the shift change is carried out from the second speed to the third speed. First, at step S30, it is decided whether or not shift change is proceeding. If an affirmative decision is made at step S30, then it is decided at step S31 whether or not permission of ratio calculation is available.

At step S32, it is decided whether the shift change operation is a shift up or a shift down. If it is decided that the shift change operation is a shift up, then the processing advances to step S33. At step S33, a ratio variation amount $\Delta R$ is calculated in accordance with a calculation expression of $\Delta R$=ratio at present−ratio upon start of shift change. At step S34, a correction coefficient base Kb is derived using the ratio variation amount $\Delta R$, information of the shift change stage at present and a correction coefficient base table shown in FIG. 17.

It is decided at step S32 that the shift change operation is a shift down, then a ratio variation amount ΔR is calculated in accordance with a calculation expression of ΔR=ratio upon start of shift change−ratio at present at step S40. At step S41, a correction coefficient base Kb is derived using the ratio variation amount ΔR, information of the shift change stage at present and the correction coefficient base table similarly as at step S34 described above. It is to be noted that, in the case of a shift down, since the ratio at present becomes lower than the ratio upon start of the shift change, it is set that the ratio variation amount ΔR is calculated by subtracting the ratio at present from the ratio upon start of the shift change.

If a negative decision is made at step S30, that is, if it is decided that shift change is not proceeding, then the processing advances to step S35. It is to be noted that, in the present embodiment, that "shift change is not proceeding" corresponds to a state in which the clutch disengagement side gear is changed over to the neutral state upon completion of passing of the clutch. Then, at step S35, the ratio calculation is inhibited and setting for the ratio variation amount ΔR=0 and the correction coefficient base Kb=1.0 is executed, thereby ending the series of controlling operations.

On the other hand, if a negative decision is made at step S31, then it is determined that, although shift change is proceeding, a ratio calculation permission responsive to release of the second clutch is not issued, and the processing advances to step S36, at which it is decided whether or not the second clutch is disengaged. It is to be noted that, in the present embodiment, it is set such that, by issuing a disengagement instruction to the clutch which is being currently engaged, that is, by issuing a signal for closing the clutch actuator, it is decided that the second clutch is disengaged.

Figure 17:
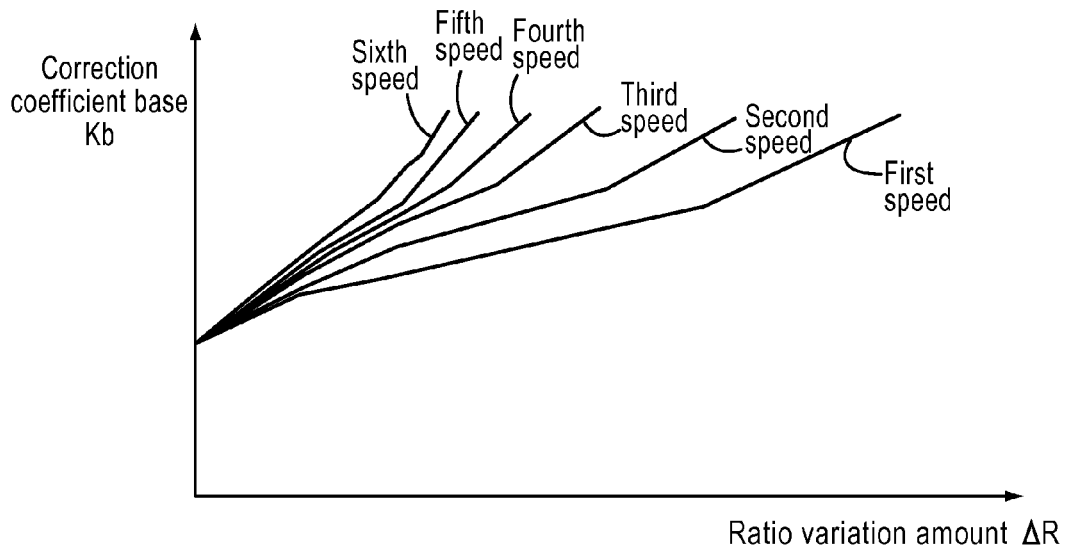
FIG. 17 is a correction coefficient base table.

If an affirmative decision is made at step S36, then the processing advances to step S37, at which ratio calculation is permitted and the ratio at present is stored as a shift change start ratio and then the ratio variation amount ΔR is set to ΔR=0. At subsequent step S38, the correction coefficient base table illustrated in FIG. 17 is used to derive a correction coefficient base Kb, thereby ending the series of controlling operations. On the other hand, if a negative decision is made at step S36, that is, if it is decided that the second clutch is not disengaged, then the processing advances to step S39, at which the ratio at present is stored as a shift change start ratio and the ratio variation amount ΔR is set to ΔR=0 and besides setting of the correction coefficient base Kb to Kb=1.0 is executed, thereby ending the series of controlling operations.

Figure 18:
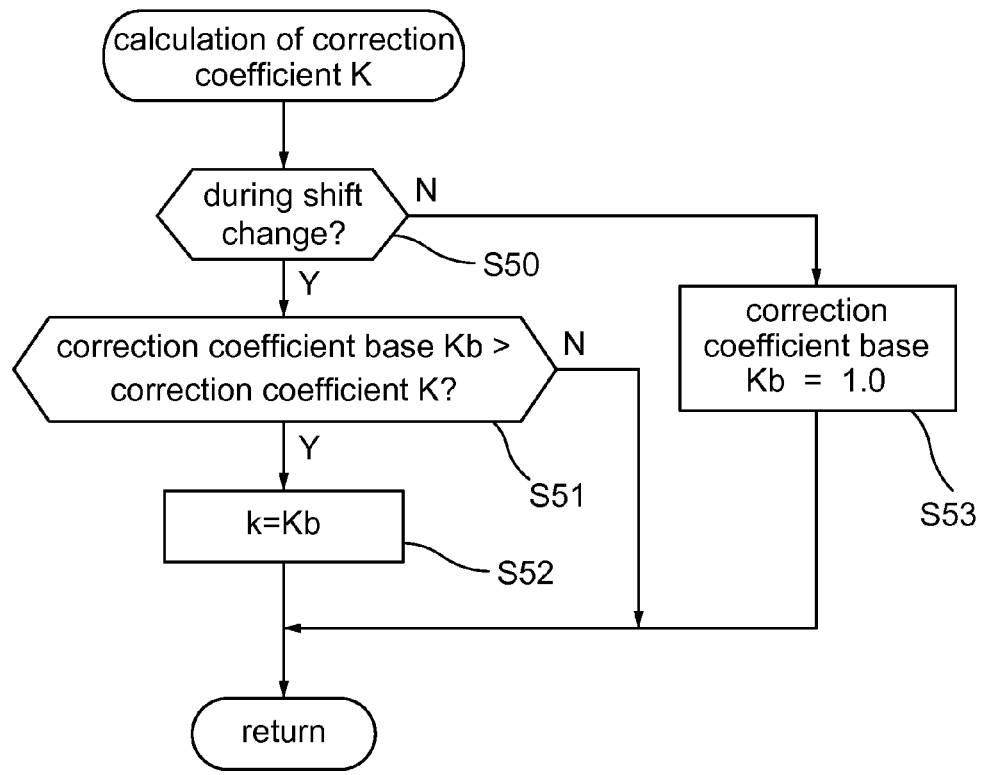
FIG. 18 is a flow chart illustrating a procedure of a calculation process of a correction coefficient K.

FIG. 18 is a flow chart illustrating an example of a procedure of a calculation process of the correction coefficient K. First at step S50, it is decided whether or not shift change is proceeding, and if an affirmative decision is made, then the processing advances to step S51. At step S51, it is decided whether or not the value of the correction coefficient base Kb is higher than the value of the correction coefficient K. If an affirmative decision is made at step S51, then the processing advances to step S52, at which the correction coefficient K is set to the value of Kb, thereby ending the series of controlling operations. With this procedure, where a correction coefficient K is set already, it can be updated only when the correction coefficient base Kb derived newly exceeds the correction coefficient K. It is to be noted that, if a negative decision is made at step S50, then the correction coefficient base Kb is set to Kb=1.0 at step S53, thereby ending the series of controlling operations. However, if a negative decision is made at step S51, then the step S52 is skipped and the series of controlling operations is ended.

Figure 19:
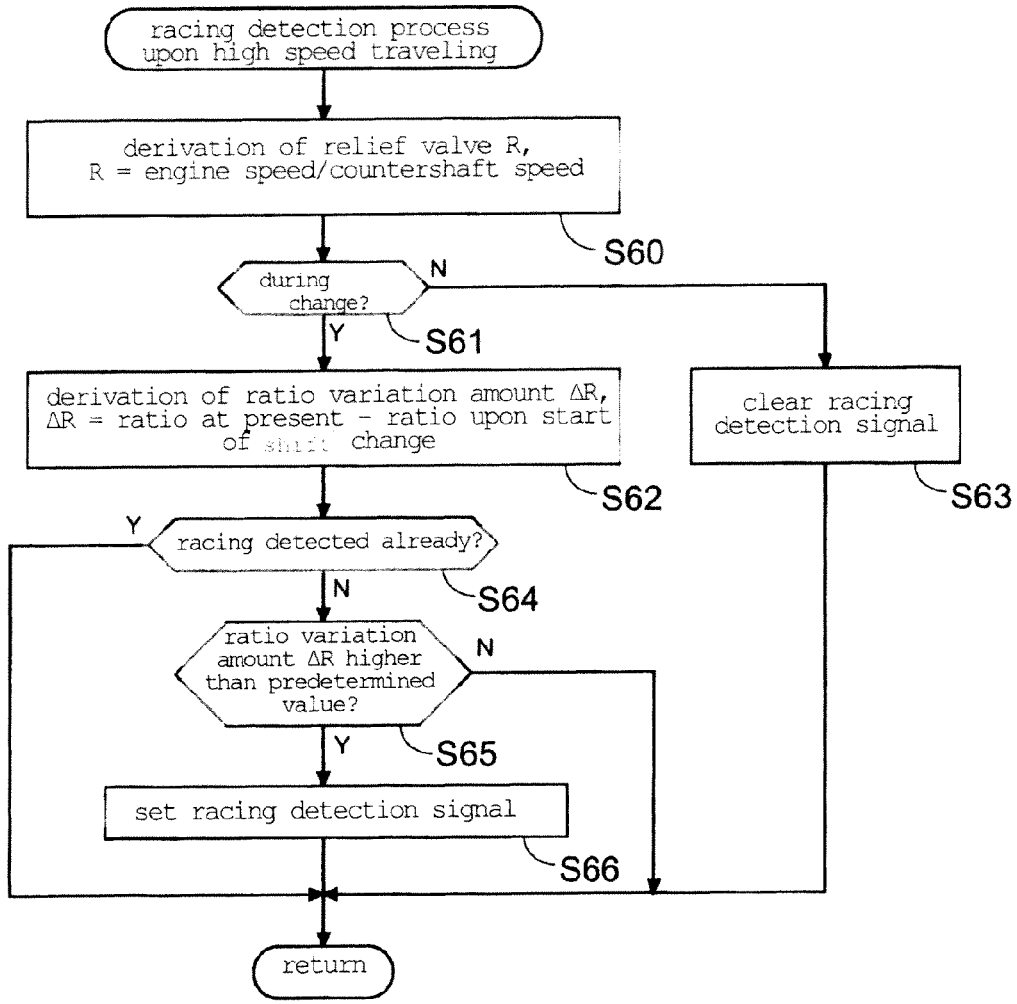
FIG. 19 is a flow chart illustrating a flow of a racing detection process upon shift change.

In the following, a general flow of the clutch correction control upon occurrence of racing is confirmed with reference to FIGS. 19 and 20. FIG. 19 is a flow chart illustrating a flow of a racing detection process upon shift change. First, at step S60, calculation of the input/output power ratio R at present is carried out in accordance with a calculation expression of R=engine speed/countershaft speed. At step S61, it is decided whether or not shift change is proceeding, and if an affirmative decision is made, then the processing advances to step S62. On the other hand, if a negative decision is made at step S61, then the processing advances to step S63, at which the racing detection signal is cleared, thereby ending the series of controlling operations.

At step S62, the ratio variation amount ΔR is calculated in accordance with a calculation expression of ΔR=ratio at present−ration upon start of shift change. At step S64, it is decided whether or not a racing state is detected already, and if a negative decision is made, then it is decided at step S65 whether or not the ratio variation amount ΔR is higher than a predetermined value. If an affirmative decision is made at step S65, then the processing advances to step S66, at which a racing detection signal is set, thereby ending the series of controlling operations. On the other hand, if an affirmative decision is made at step S64, then the steps S65 and S66 are skipped, or if a negative decision is made at step S65, then the step S66 is skipped, thereby ending the series of controlling operations.

Figure 20:
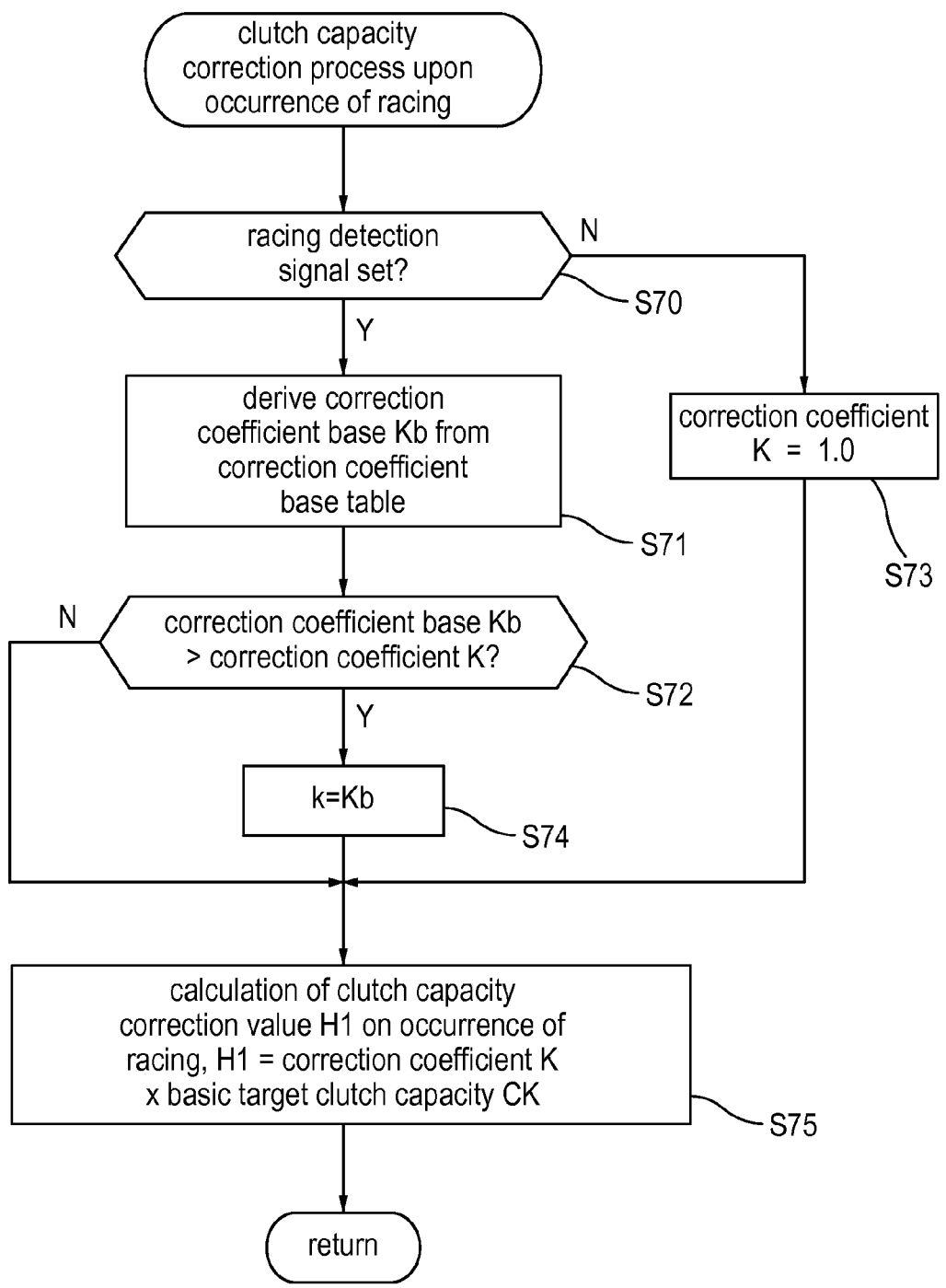
FIG. 20 is a flow chart illustrating a detailed flow of a clutch capacity correction process upon occurrence of racing.

FIG. 20 is a flow chart illustrating an example of a detailed flow of a clutch capacity correction process upon occurrence of racing. First at step S70, it is decided whether or not a racing detection signal is set. If an affirmative decision is made at step S70, then the processing advances to step S71, at which a correction coefficient base Kb is derived using the correction coefficient base table.

At subsequent step S72, it is decided whether or not the correction coefficient base Kb is higher than a prescribed (set in the process in the preceding cycle) correction coefficient K. If an affirmative decision is made, then setting of K=Kb is executed at step S74, whereafter the processing advances to step S75. On the other hand, if a negative decision is made at step S72, then the processing advances to step S75 with the prescribed correction coefficient K maintained. Then at step S75, a clutch capacity correction value H1 on occurrence of racing is calculated using a calculation expression of H1=correction coefficient K×basic target clutch capacity CK, thereby ending the series of controlling operations. It is to be noted that, if a negative decision is made at step S70, then the correction coefficient K is set to K=1.0 (no correction) at step S73, whereafter the processing advances to step S75. The calculated value of the clutch capacity correction value H1 on occurrence of racing is used for calculation of the target clutch capacity C as illustrated in FIG. 8.

In the following, the "control wherein, upon changeover of the clutch upon a shift changeover operation, if the shift change is not completed even if a predetermined period of time elapses, the clutch is engaged compulsorily" of the control scheme (3) described hereinabove is described with reference to FIGS. 21 to 26.

Figure 21:
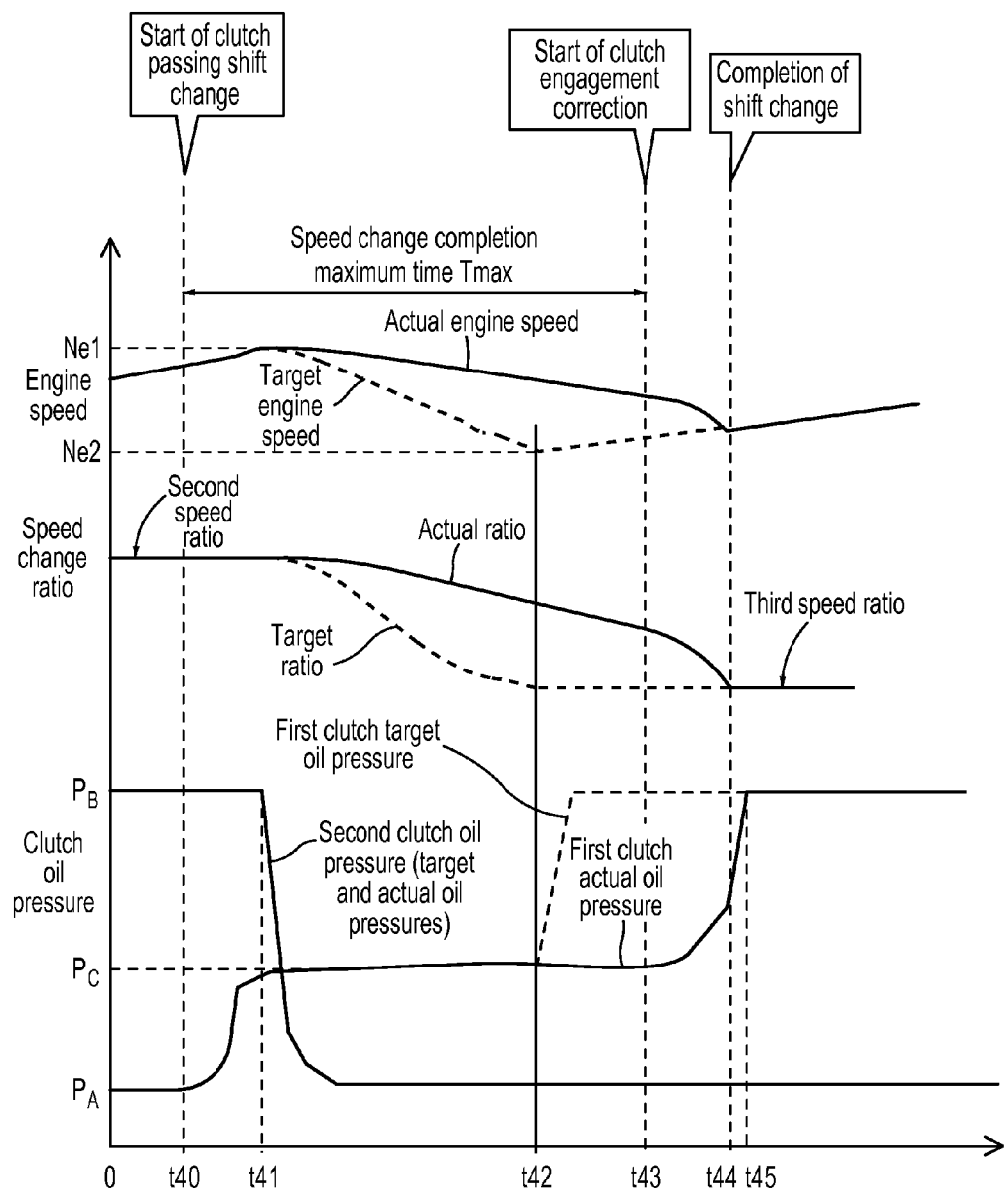
FIG. 21 is a time chart illustrating a flow of clutch control upon clutch passing.

FIG. 21 is a time chart illustrating an example of a flow of clutch control upon clutch passing. In this figure, the engine speed, input/output power ratio and clutch oil pressure are indicated in order from above. If the clutch capacity on the engagement side becomes insufficient upon passing of the clutch, then, for example, although racing of the engine speed by acceleration does not occur, there is the possibility that the time after the start of shift change till the end of the shift change becomes longer than planned time due to a slip phenomenon of the clutch. In the present embodiment, if the time required for the shift change operation exceeds predetermined shift change completion maximum time, then the clutch oil pressure on the engagement side is raised to compulsorily complete the shift change operation.

The example of this figure corresponds to a state in which, during traveling at the second speed, that is, in a state in which the second clutch is engaged and the first clutch is disengaged, a shift up to the third speed is carried out. And, if a shift change instruction is issued at time t40, then oil pressure supply for changing over the first clutch which has been in the disengaged state to the engaged state is started in response to the shift change instruction. Thus, the clutch oil pressure begins to rise from a disengagement oil pressure $P_A$. At time t41, the clutch oil pressure of the second clutch which has been in the engaged state starts decrease from an engagement oil pressure $P_B$ in response to the shift change instruction.

And, originally the engine speed and the input/output power ratio ought to decrease toward a target engine speed and a target ratio indicated by broken lines while the supply oil pressure for the second clutch is maintained in the proximity of a predetermined intermediate oil pressure $P_C$. However, in the example of the figure, since the clutch capacity of the first clutch is short, a delay occurs with the clutch engagement and the engine speed and the actual ratio vary as indicated by solid lines. Further, while originally the supply oil pressure for the first clutch ought to be raised to complete the clutch engagement at time t42, even if time passes time t42, the actual oil pressure does not become high and a state in which the clutch engagement is not completed is exhibited. It is to be noted that, in the graph of the engine speed, an engine speed Ne1 upon start of shift change and an engine speed Ne2 where the shift change to the third speed is completed while the vehicle speed upon start of the shift change is maintained.

At this time, the shift change controlling apparatus according to the present embodiment starts, in response to lapse of shift change completion maximum time Tmax calculated upon start of the shift change, correction control of compulsorily raising the oil pressure for the first clutch at time t43 and then completes the clutch engagement at subsequent time t44. It is to be noted that the actual oil pressure for the first clutch is raised until it reaches the stroke start oil pressure $P_B$ at time t45. Further, the correction of raising the clutch oil pressure is set such that the correction amount increases in response to the elapsed time from time t43 at which the shift change completion maximum time Tmax elapses.

Figure 22:
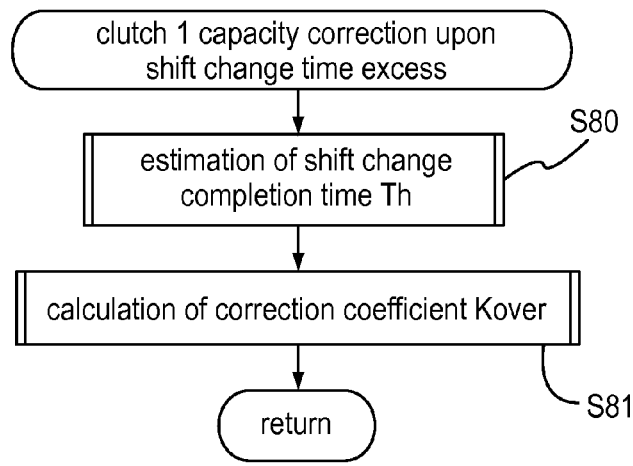
FIG. 22 is a flow chart illustrating a flow of clutch 1 capacity correction control upon shift change time excess.

FIG. 22 is a flow chart illustrating a flow of clutch 1 capacity correction control upon shift change time excess. The clutch 1 capacity correction control upon shift change time excess is roughly configured from two steps. First at step S80, shift change completion time Th is estimated using a plurality of calculation expressions. Then at step S81, a clutch 1 capacity correction coefficient Kover upon shift change time excess is calculated, thereby ending the series of control operations.

The calculated correction coefficient Kover is used for correction of the clutch control amount by the clutch control correction amount calculation section 150 (refer to FIG. 7). It is to be noted that, if a shift change time excess phenomenon from an odd-numbered stage gear position to an even-numbered stage gear position occurs, then similar correction control can be executed for the second clutch.

Figure 23:
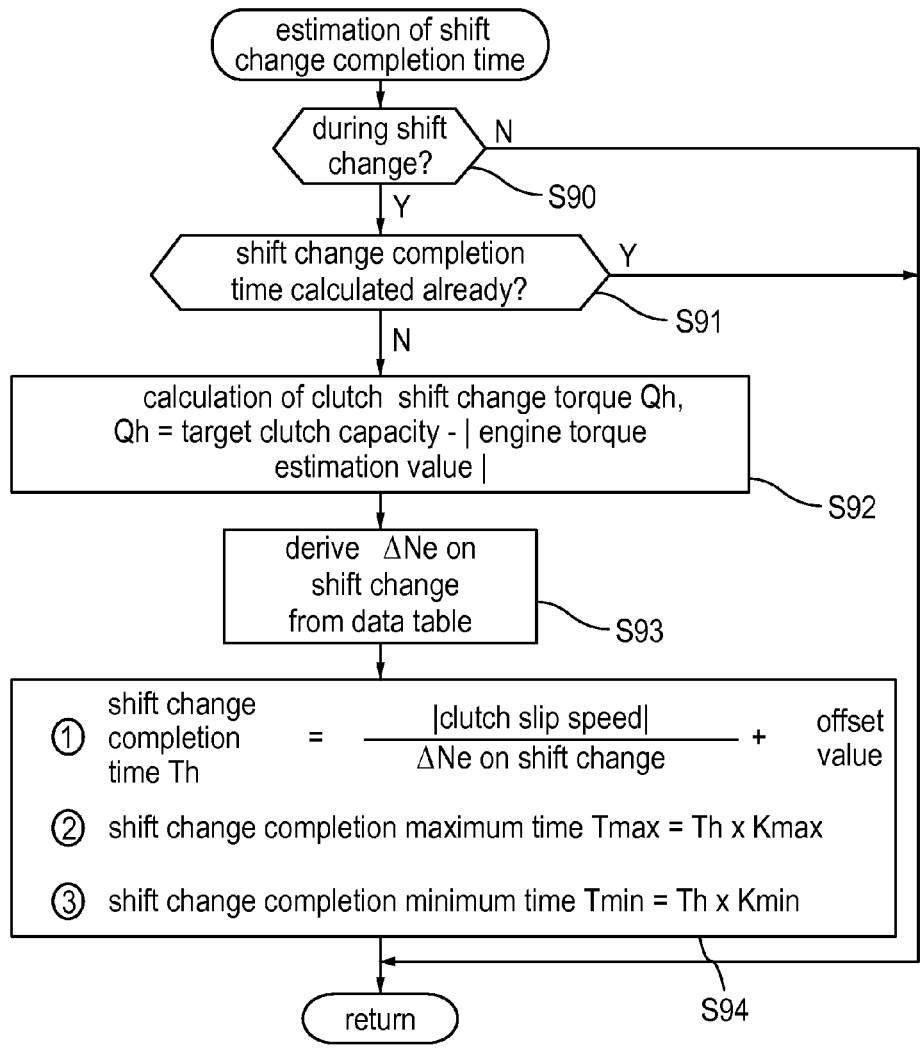
FIG. 23 is a flow chart of a procedure of an estimation process of shift change completion time.

FIG. 23 is a flow chart illustrating an example of a procedure of an estimation process of shift change completion time. First at step S90, it is decided whether or not shift change is proceeding. If an affirmative decision is made at step S90, then the processing advances to step S91, at which it is decided whether or not shift change completion time is calculated already. It is to be noted that, if a negative decision is made at step S90 or if an affirmative decision is made at step S91, then it is determined that there is no necessity to estimate the shift change completion time, and the control is ended immediately.

Figure 24:
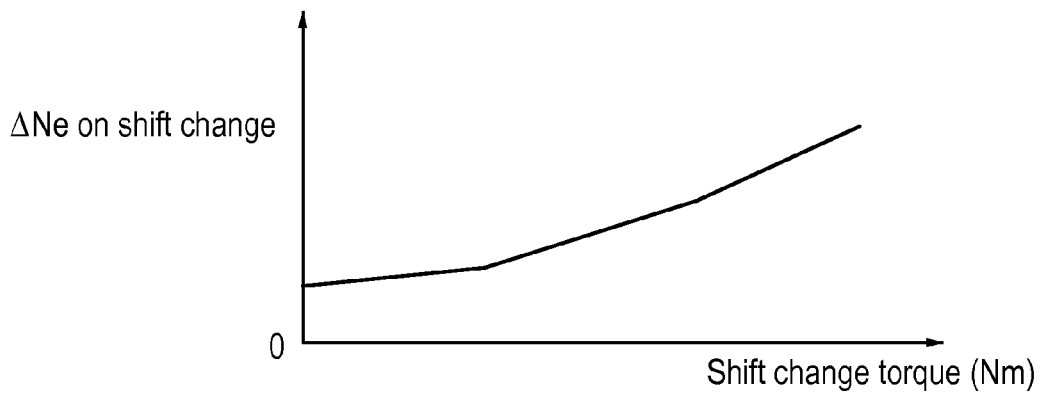
FIG. 24 is a data table illustrating a relationship between shift change torque Qh and a speed variation ΔNe on shift change.

Then, if a negative decision is made at step S91, then the processing advances to step S92, at which clutch shift change torque Qh is calculated using a calculation expression of Qh=|target clutch capacity−engine torque estimated value|. Then at step S93, a speed variation ΔNe on shift change is derived using a data table illustrated in FIG. 24. FIG. 24 illustrates a data table indicative of a relationship between the clutch shift change torque Qh and the speed variation ΔNe on shift change, and a predetermined speed variation ΔNe on shift change can be derived by applying the clutch shift change torque Qh calculated at step S92 described above to the data table.

Then at step S94, values of the (1) shift change completion time Th, (2) shift change completion maximum time Tmax and (3) shift change completion minimum time Tmin are calculated, respectively. The shift change completion time Th is determined in accordance with a calculation expression of Th=(|clutch slip speed|/speed variation ΔNe on shift change)+offset value. In particular, the clutch slip speed here is calculated as a difference between the engine speed Ne1 upon start of shift change and the engine speed Ne2 when shift change to the next stage is carried out at the vehicle speed at present. It is to be noted that the offset value is a value determined arbitrarily so that the shift change completion time may not become excessively short.

Meanwhile, the shift change completion maximum time Tmax and the shift change completion minimum time are calculated by multiplying calculated Th by a coefficient Kmax and another coefficient Kmin (Kmax>Kmin) determined arbitrarily, respectively. In the present embodiment, the calculated shift change completion maximum time Tmax is used such that, if the elapsed time from the start of shift change exceeds the shift change completion maximum time Tmax, then correction control of raising the oil pressure to the first clutch is executed.

Figure 25:
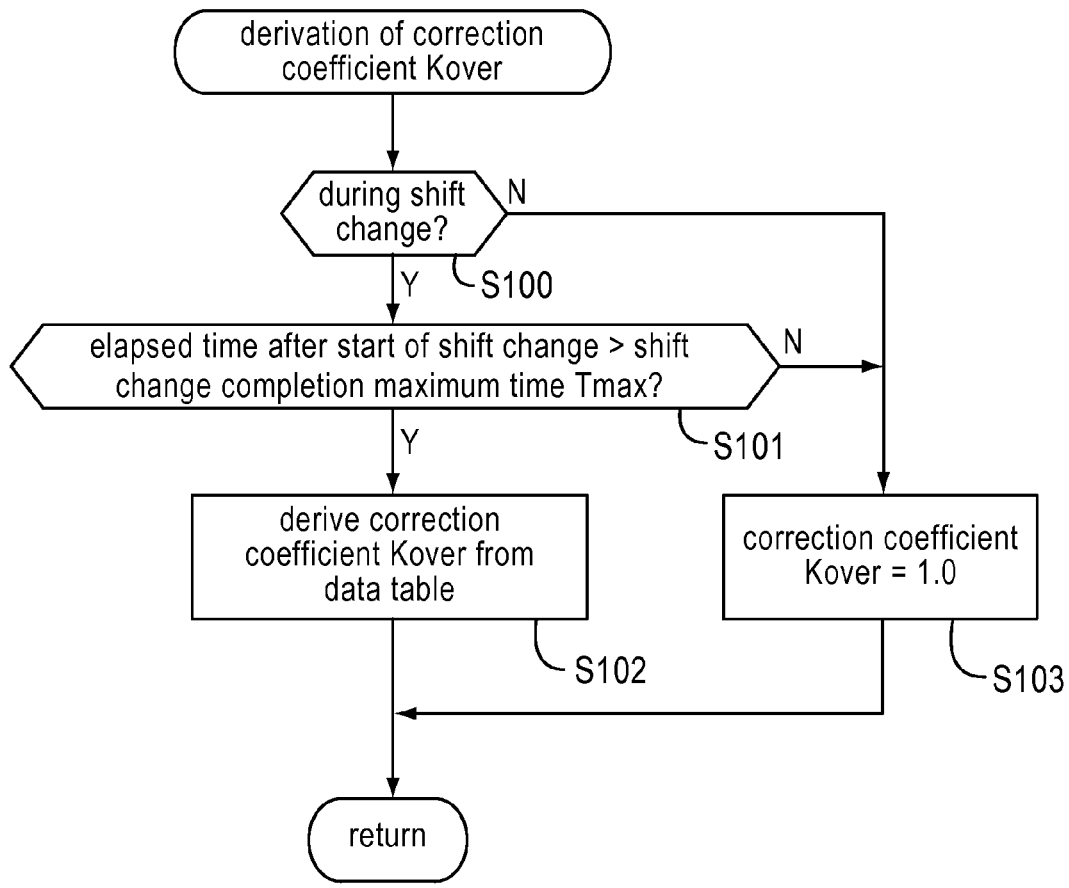
FIG. 25 is a flow chart illustrating a procedure of deriving a correction coefficient Kover.
Figure 26:
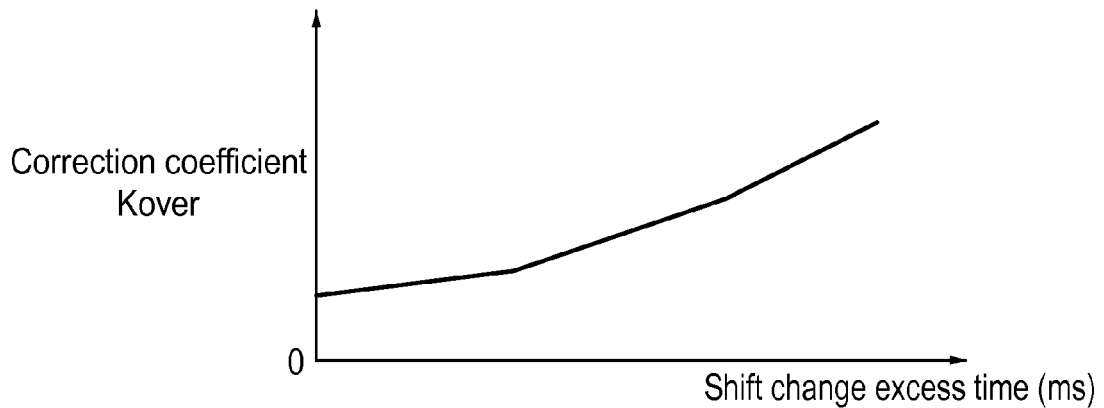
FIG. 26 is a data table illustrating a relationship between shift change over time and the correction coefficient Kover.

FIG. 25 is a flow chart illustrating an example of a procedure of deriving a correction coefficient Kover. First at step S100, it is decided whether or not shift change is proceeding, and if an affirmative decision is made, then the processing advances to step S101. At step S101, it is decided whether or not the elapsed time after the start of shift change (shift change exceeding time) exceeds the shift change completion maximum time Tmax. If an affirmative decision is made at step S101, then the processing advances to step S102, at which a correction coefficient Kover is derived using the data table indicative of the relationship between the shift change excess time and the correction coefficient Kover illustrated in FIG. 26. It is to be noted that, if a negative decision is made at step S100 or S110, then the processing advances to step S103, at which the correction coefficient Kover is set to Kover=1.0 (no correction), thereby ending the series of control operations. The derivation process of the correction coefficient Kover described above is executed by the clutch capacity correction section 220 on shift change time excess.

Now, the "control wherein, in order to prevent generation of hammering upon pre-shift change, an appropriate waiting time period after an operation for removing the pre-load is started until driving of the shift gears is started is set" of the control scheme (4) described hereinabove is described with reference to FIGS. 27 to 32.

Figure 27:
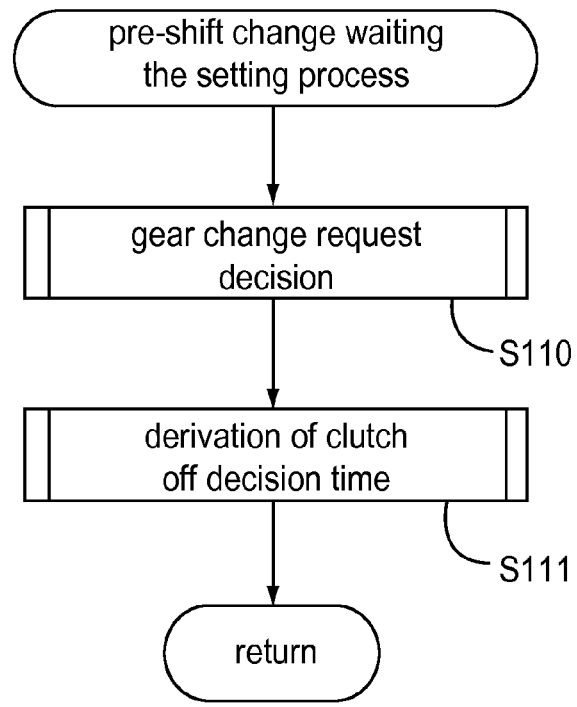
FIG. 27 is a flow chart illustrating a procedure of a pre-shift change waiting time setting process.

FIG. 27 is a flow chart illustrating an example of a procedure of a pre-shift change waiting time setting process. The pre-shift change waiting time setting process is executed by the pre-shift change waiting time setting section 160 (refer to FIG. 7) and is roughly configured from two steps. First at step S110, a decision of a gear change request is executed. Then at step S111, clutch off decision time is derived, thereby ending the series of controlling operations.

As described hereinabove, in the shift change controlling apparatus according to the present invention, in order to reduce gear hammering upon shift change during normal traveling, that is, upon clutch passing, a low oil pressure (pre-pressure) for eliminating a play between gears is supplied to the clutch on the disengagement side. However, if the pre-pressure remains applied, then hammering is generated upon gear operation by pre-shift change. Therefore, operation of removing the pre-pressure is required before pre-shift change. However, during engine rotation, even if the clutch actuator is changed over to the clutch disengagement side, the actual oil pressure does not drop immediately by an influence of the centrifugal force. Therefore, it is necessary to wait execution of the pre-shift change until after the actual oil pressure drops. This "pre-shift change waiting time" corresponds to the "clutch off decision time" derived at step S111 described hereinabove.

Even if, during rotation of the engine, the clutch actuator is changed over to the clutch disengagement side, the actual oil pressure does not drop immediately by an influence of the centrifugal force is such as described below. The oil pressure for the clutch engagement is controlled by a pressure balance between the engagement side hydraulic chamber (piston chamber) for supplying oil pressure and the disengagement side hydraulic chamber for removing the oil pressure, and the centrifugal forces applied to both "chambers" by rotation of the transmission shaft (main shaft) cancel each other by the pressure balance of the two chambers. However, in a transition state in which the oil pressure is supplied or removed, a state in which the balance is lost appears temporarily. Therefore, a transition state exists in which, even if the hydraulic sensors (SE8 and SE9) provided for the oil pressure supply paths detect an oil pressure drop, the actual oil pressure applied to the clutch does not drop. Accordingly, since the influence of the centrifugal force when the balance is lost becomes greater as the speed of the transmission shaft becomes higher, it becomes necessary to set waiting time (oil pressure stabilization time) in accordance with the speed of the transmission shaft.

Figure 28:
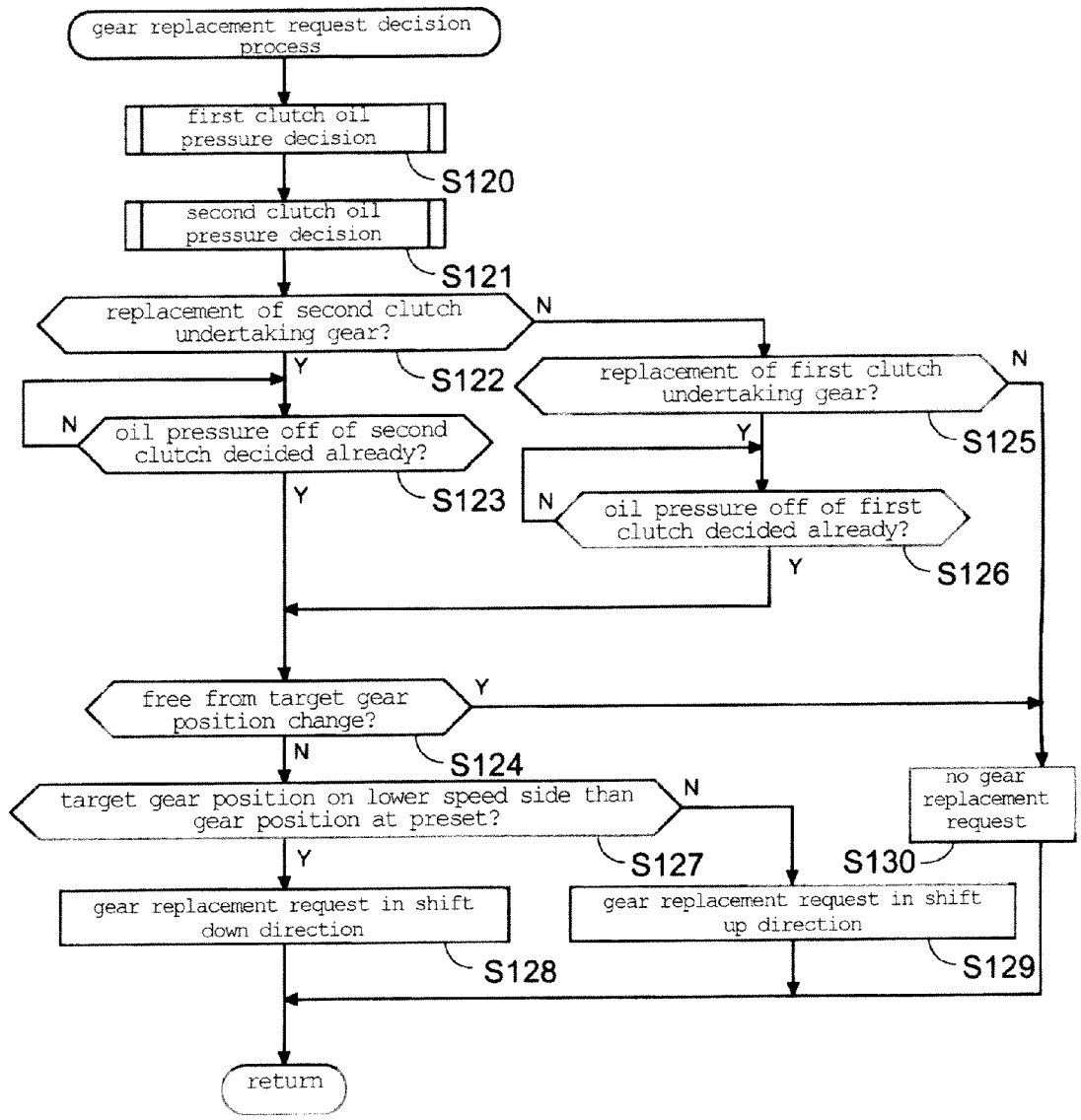
FIG. 28 is a flow chart illustrating a gear replacement request decision process.

FIG. 28 is a flow chart illustrating a procedure of a gear change request decision process. At step S120, oil pressure decision of the first clutch is carried out, and at step S121, oil pressure decision of the second clutch is carried out. The clutch oil pressure decision is given as an on decision or an off decision, and in the present embodiment, if the clutch oil pressure decision upon pre-shift change changes over from the on decision to the off decision, then a gear replacement operation is executed. Here, a sub flow chart of FIG. 29 is referred to.

Figure 29:
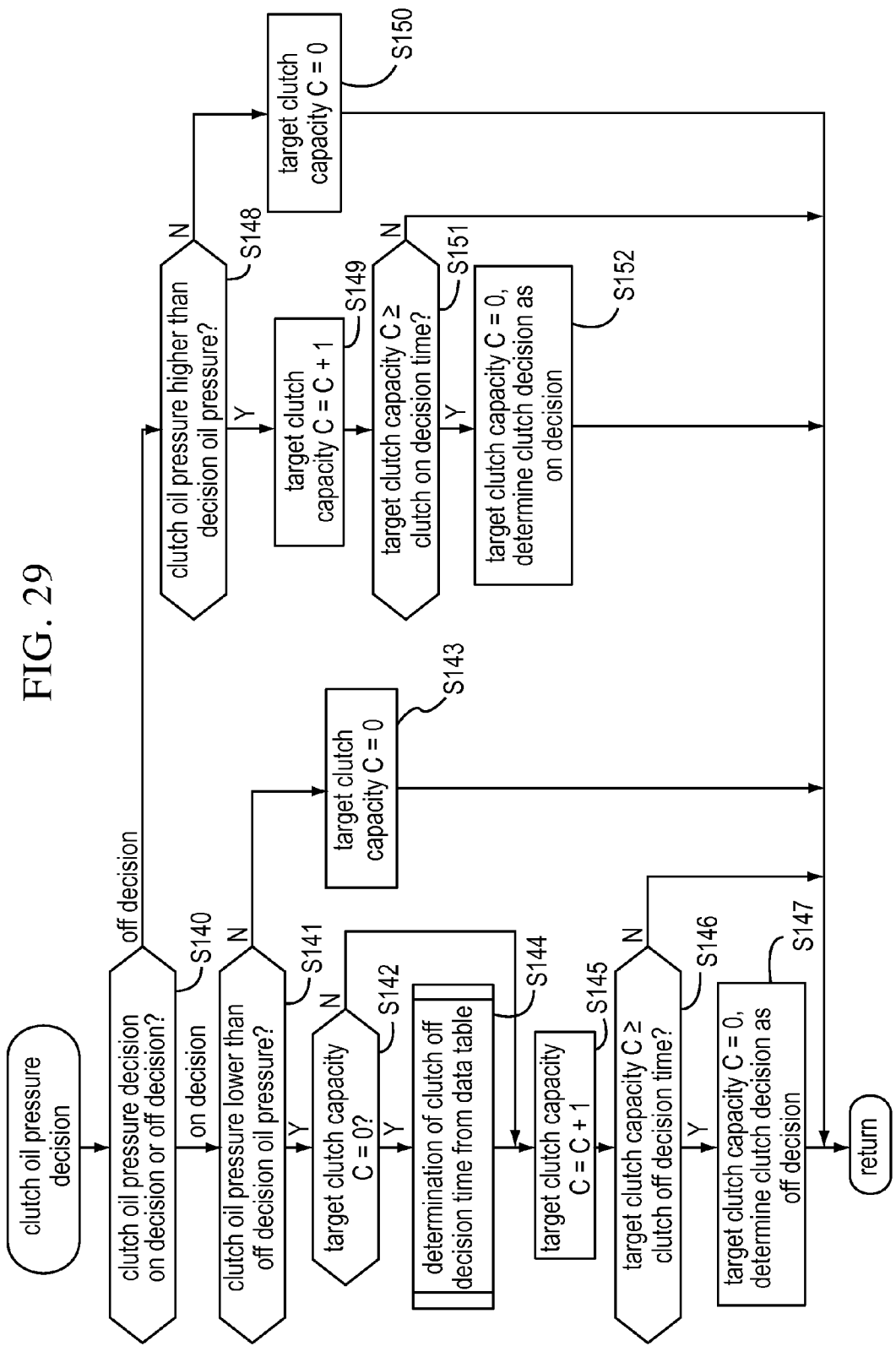
FIG. 29 is a sub flow chart illustrating a procedure for clutch oil pressure decision.

FIG. 29 is a sub flow chart illustrating a procedure of a clutch oil pressure decision. First at step S140, it is decided whether the clutch oil pressure decision is the on decision or the off decision, and if the clutch oil pressure decision is the on decision, then the processing advances to step S141. At step S141, it is decided whether or not the clutch oil pressure is lower than an off decision oil pressure, and if an affirmative decision is made, then the processing advances to step S142. According to the decision at step S141, calculation of the waiting time till pre-shift change can be carried out after it is detected that the oil pressure detected by the first clutch oil pressure sensor SE8 or SE9 becomes lower than the predetermined value.

At step S142, it is decided whether or not the counter value C by a timer is C=0, and if an affirmative decision is made, then the processing advances to step S144. At step S144, clutch off decision time is set using a data table hereinafter described. Here, a sub flow chart of FIG. 30 is referred to.

Figure 30:
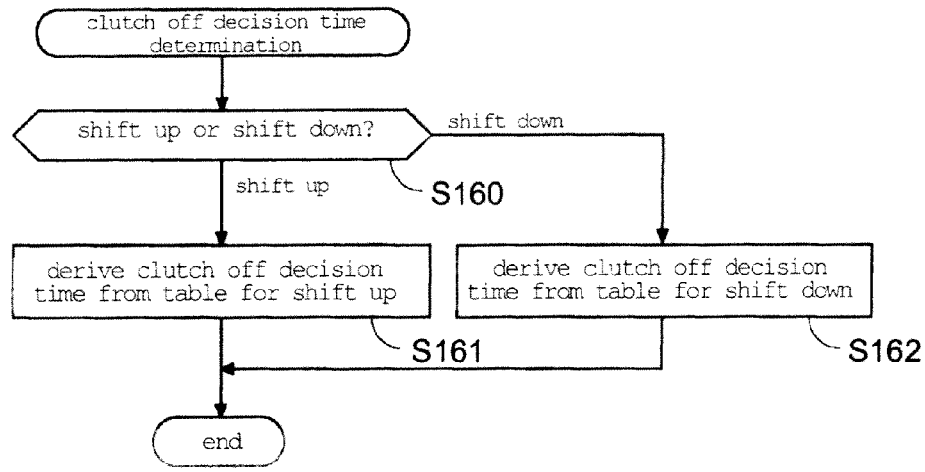
FIG. 30 is a sub flow chart illustrating a procedure of a clutch off decision time determination process.

FIG. 30 is a sub flow chart illustrating a procedure of a clutch off decision time determination process. First at step S160, it is decided whether the shift change operation is a shift up or a shift down, and if it is decided that the shift change operation is a shift up, then the processing advances to step S161, at which clutch off decision time is derived using a shift up data table shown in FIG. 31. On the other hand, if it is decided at step S160 that the shift change operation is a shift down, then the processing advances to step S162, at which clutch off decision time is derived using a shift down data table illustrated in FIG. 32.

Figure 31:
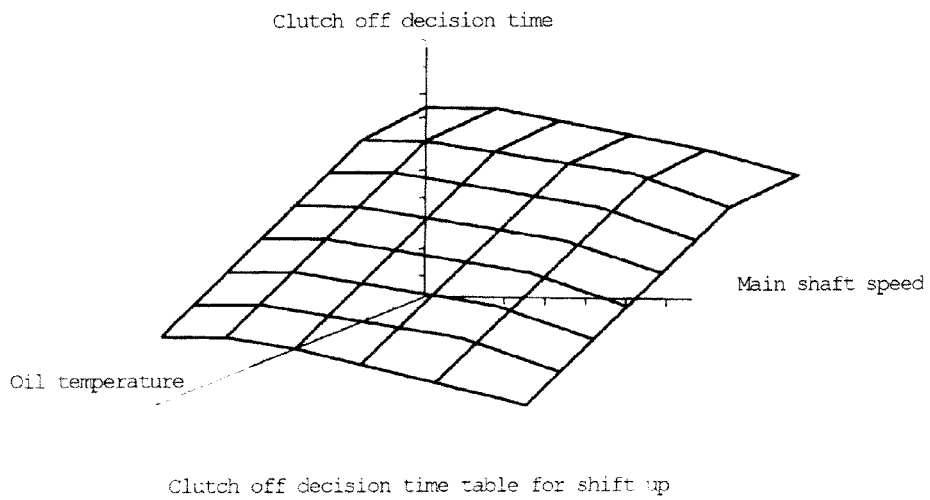
FIG. 31 is a clutch off decision time table for a shift up.
Figure 32:
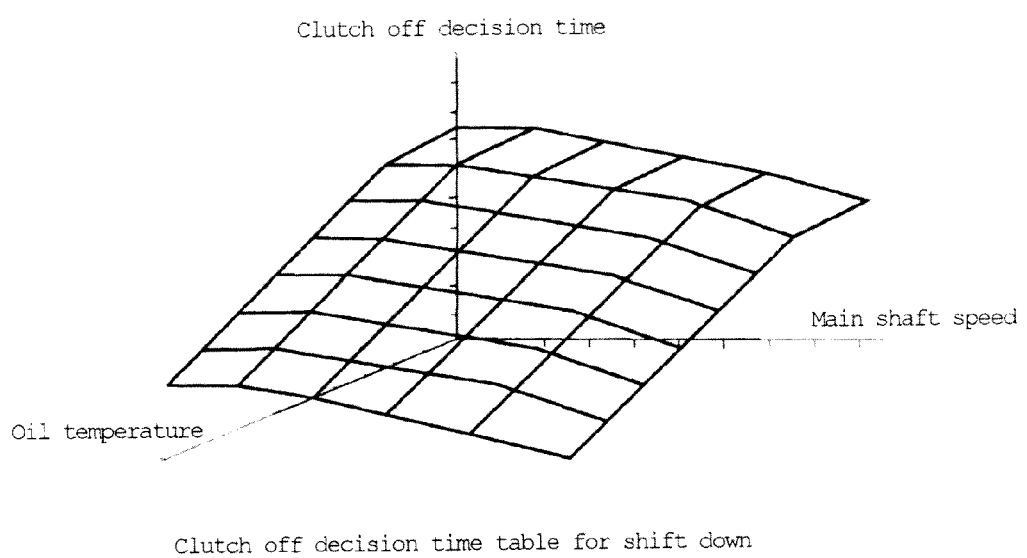
FIG. 32 is a clutch off decision time table for a shift down.

As illustrated in FIGS. 31 and 32, each of the clutch off decision time tables for a shift up and for a shift down is a three-dimensional data table indicative of a relationship of the main shaft speed, oil temperature and clutch off decision time. The main shaft speed is the speed of one of the inner shaft 43 and the outer shaft 44 in response to the shift change stage.

The clutch off decision time is set such that it increases as the main shaft speed increases but decreases as the oil temperature rises. Further, in the present embodiment, the clutch off decision time applied upon a shift down is set so as to be longer than the clutch off decision time applied upon a shift up. Consequently, the clutch off decision time is set so as to correspond to the fact that, while, upon a shift up, the engine speed drops, upon a shift down, the engine speed rises to increase the influence of the centrifugal force.

Referring back to the sub flow chart of FIG. 29, after clutch off decision time is determined at step S144, the counter value C is set to C=C+1 at step S145, whereafter the processing advances to step S146. At step S146, it is decided whether or not the counter value C exceeds the clutch off decision time. If an affirmative decision is made at step S146, that is, if the counter value C by the timer reaches the clutch off decision time derived from the data table, then the processing advances to step S147, at which the counter value C is set to C=0 and the clutch decision is set to an off decision, thereby ending the series of control operations.

It is decided at step S140 that the clutch hydraulic decision is the off decision, then the processing advances to step S148, at which it is decided whether or not the clutch oil pressure is higher than an on decision oil pressure. If an affirmative decision is made at step S148, then at subsequent step S149, the counter value C is set to C=C+1, whereafter the processing advances to step S151. At step S151, it is decided whether or not the counter value C exceeds clutch on decision time determined arbitrarily, and if an affirmative decision is made, then the processing advances to step S152. At step S152, the counter value C is set to C=0 and the clutch decision is set to the on decision, thereby ending the series of control operations.

If a negative decision is made at step S146 or S151, then the control is ended immediately. Further, if a negative decision is made at step S141 or S148, then the counter value C is set to C=0 at step S143 or S150, thereby ending the series of control operations.

While the sub flow chart of FIG. 29 corresponds to the oil pressure decision of the first clutch, the oil pressure decision of the second clutch is similarly executed. Further, clutch off decision time tables are prepared for the first clutch and the second clutch.

Referring back to the main flow of FIG. 28, after the oil pressure decision regarding both clutches at steps S120 and S121 is completed, the processing advances to step S122, at which replacement of the second clutch undertaking gear train should be carried out. If an affirmative decision is made at step S122, then the processing advances to step S123, at which it is decided whether or not the an oil pressure off decision of the second clutch is made already. If an affirmative decision is made, then the processing advances to step S124. Here, the case in which an affirmative decision is made at step S122 or S123 corresponds to a case in which, when, during traveling at an odd-numbered stage gear speed (for example, at the third speed), pre-shift change to an even-numbered stage gear speed (for example, to the fourth speed) is executed, the pre-pressure having been applied to the second clutch is removed. It is to be noted that, if a negative decision is made at step S123, then the processing returns to the decision at step S123.

On the other hand, if a negative decision is made at step S122, then the processing advances to step S125, at which replacement of the first clutch undertaking gear should be carried out. If an affirmative decision is made at step S125, then the processing advances to step S126, at which it is decided whether or not an oil pressure off decision of the first clutch is made already. Then, if an affirmative decision is made, then the processing advances to step S124. Here, the case in which an affirmative decision is made at step S125 or S126 corresponds to a case in which, when, during traveling at an even-numbered stage gear speed, pre-shift change to an odd-numbered stage gear speed is executed, the pre-pressure having been applied to the first clutch is removed. It is to be noted that, if a negative decision is made at step S126, then the processing returns to the decision at step S126.

At step S124, it is decided whether or not the target gear position is free from variation, and if a negative decision is made, that is, if the target gear position undergoes variation, then the processing advances to step S127. It is to be noted that, if a negative decision is made at step S124 or S125, then the processing advances to step S130, at which it is determined that there is no gear exchange request, thereby ending the series of controlling operations.

Then at step S127, it is decided whether or not the target gear position is on the lower speed side with respect to the gear position at present, and if an affirmative decision is made, then a gear replacement request in the shift down direction is issued, that is, pre-shift change is executed, at step S128, thereby ending the series of controlling operations. On the other hand, if a negative decision is made at step S127, then a gear replacement request in the shift up direction is issued at step S129, thereby ending the series of controlling operations.

As described above with the control scheme (4) described hereinabove, appropriate waiting time (clutch off decision time) is set for a period after operation of removing a pre-pressure is started until driving of the shift gear is started based on the engine speed and the clutch oil temperature thereby to make it possible to prevent occurrence of hammering caused by pre-shift change.

The twin clutch type transmission 23 according to the present embodiment executes control (N establishment shift change) of canceling, after the clutch which becomes the disengagement side after completion of the shift change is disengaged, the engagement of the dog clutch of the transmission gear of the disengagement side to place the dog clutch into a neutral state in which it does not engage with any gear. The waiting time described above can be applied to the N establishment shift change and besides can be utilized for various shift change operations in a transition state which is influenced by the centrifugal force of the engine.

Figure 33:
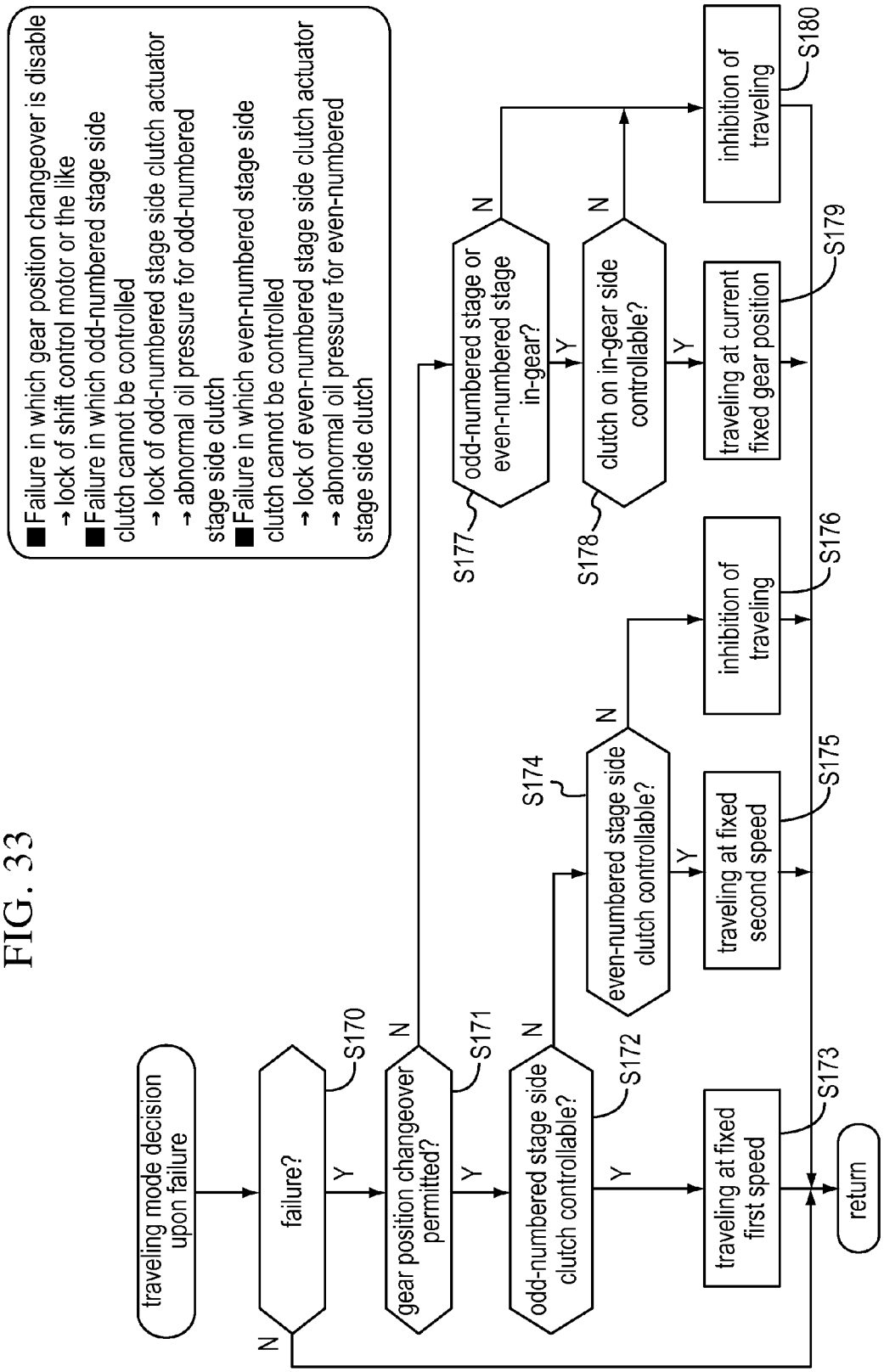
FIG. 33 is a flow chart illustrating a procedure of a decision process of a traveling mode when a failure occurs with the shift gear.

FIG. 33 is a flow chart illustrating a procedure of a decision process of a traveling mode when a failure occurs with the transmission. If such setting that, where some failure occurs with the transmission, traveling is disabled uniformly is applied, then even it is impossible to move the vehicle from the place at which the failure occurs, resulting in deterioration in convenience in use. Therefore, the shift change controlling apparatus according to the present embodiment is configured such that the type of a failure is detected and a functional restriction is carried out in response to the type of the failure such that, for example, traveling with the speed fixed to the first speed is permitted.

At step S170, it is decided whether or not the transmission suffers from a failure, and if an affirmative decision is made, then the processing advances to step S171. At step S171, it is decided whether or not the gear position can be changed over. If an affirmative decision is made at step S171, then the processing advances to step S172, at which it is decided whether or not the odd-numbered stage side clutch can be controlled. Then, if an affirmative decision is made, then the traveling mode is set to a first speed fixed traveling mode. It is to be noted that, if a negative decision is made at step S170, then it is determined that there is no necessity to decide an in-failure traveling mode, and the control is ended immediately.

If a negative decision is made at step S172, that is, if it is decided that the odd-numbered stage side clutch cannot be controlled because of locking of the odd-numbered stage side clutch actuator, an abnormal oil pressure for the odd-numbered stage side clutch or the like, then the processing advances to step S174. At step S174, it is decided whether or not the even-numbered stage side clutch can be controlled, and if an affirmative decision is made, then the processing advances to step S175, at which the traveling mode is set to a second speed fixed traveling mode. In this second speed fixed traveling mode, an even-numbered stage side clutch (in the present embodiment, the second clutch) can be controlled to a partial clutch engagement state to carry out smooth second speed starting.

if a negative decision is made at step S174, that is, if it is decided that, in addition to the decision that the odd-numbered stage side clutch cannot be controlled, also the even-numbered stage side clutch cannot be controlled because of locking of the even-numbered stage side clutch actuator, an abnormal oil pressure for the odd-numbered stage side clutch or the like, then the processing advances to step S176, at which the traveling speed is set to the traveling inhibition mode, thereby ending the series of controlling operations.

If a negative decision is made at step S171, that is, if it is decided that the gear position cannot be changed over because of locking of the shift control motor or the like, then the processing advances to step S177, at which it is decided whether or not the odd-numbered stage or the even-numbered stage is in an in-gear state. If an affirmative decision is made at step S177, then the processing advances to step S178, at which it is decided whether or not the clutch on the side which is in the in-gear state can be controlled. If an affirmative decision is made at step S178, then the processing advances to step S179, at which the traveling mode is set to a current gear fixed traveling mode.

The case in which an affirmative decision is made at step S177 or S178 corresponds to a case in which, for example, because a failure which disables changeover of the gear position occurs in a state in which the third speed gear train is in an in-gear state, the third speed fixed traveling mode is set. It is to be noted that such setting may be applied such that, if, at this time, a high speed gear train (for example, the fourth or fifth speed) upon which a high clutch burden is imposed upon starting is in an in-gear state, then traveling is inhibited. It is to be noted that, if a negative decision is made at step S177 or S178, then the processing advances to step S180, at which the traveling mode is set to a traveling inhibition mode, thereby ending the series of controlling operations.

The shift change controlling apparatus according to embodiments of the present invention can be applied to clutches having various structures. In the following, modifications to the clutch are described with reference to FIGS. 34 to 37.

Figure 34:
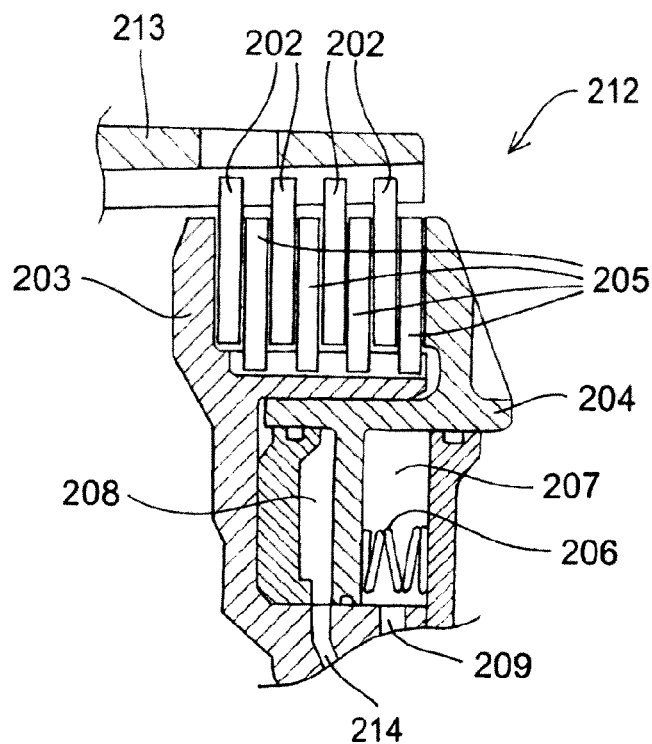
FIG. 34 is a sectional view showing a configuration of a hydraulic clutch of the normally closed type.

FIG. 34 is a sectional view showing a configuration of a hydraulic clutch 212 of the normally closed type. A general configuration of the transmission is same as that of the twin clutch type transmission 23 shown in FIG. 5. The hydraulic clutch 212 is of the normally closed type wherein, when oil pressure control is not carried out, the hydraulic clutch 212 is in a clutch engaged state and, by supplying oil pressure opposing to the biasing force of a disengagement side oil pressure chamber 208 to a return spring 206 through an oil pressure supply oil path 214, the hydraulic clutch 212 is changed over to a clutch disengagement state.

The hydraulic clutch 212 includes the return spring 206 for biasing a pressure plate 204 toward the clutch engagement side, the disengagement side oil pressure chamber 208 for applying pressing force toward the clutch disconnection side to the pressure plate 204, and the engagement side oil pressure chamber 207 for applying pressing force toward the clutch engagement side to the pressure plate 204 to assist returning movement of the pressure plate 204. A supply oil path 209 is communicated with an engagement side oil pressure chamber 207.

A plurality of clutch plates 202 are supported for integral rotation on an inner circumference of the clutch outer 301, and a plurality of clutch disks 205 are supported for integral rotation on a flange portion 203. And, by displacing the pressure plate 204 in an axial direction by supply oil pressure from the outside, frictional engagement between the clutch plates 202 and the clutch disks 205 is canceled thereby to change over the clutch from an engaged state to a disengaged state.

Figure 35:
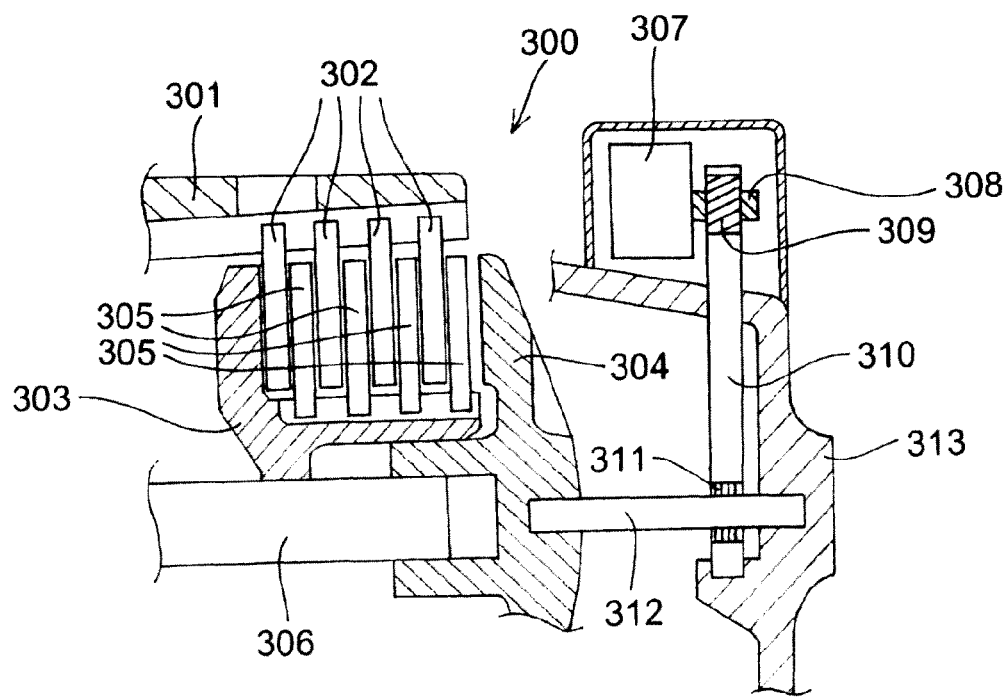
FIG. 35 is a sectional view showing a configuration of an electric clutch.

FIG. 35 is a sectional view showing a configuration of an electric clutch 300 wherein a pressure plate 304 is driven directly by driving force of an electric motor 307. A plurality of clutch plates 302 are supported for integral rotation on an inner circumference of a clutch outer 301, and a plurality of clutch disks 305 are supported for integral rotation on a flange portion 303. And, by displacing the pressure plate 304 in an axial direction by driving force of the electric motor 307, the frictional engagement state between the clutch plates 302 and the clutch disks 305 is changed to carry out engagement/disengagement control of the clutch.

A helical gear 308 formed on a rotary shaft of the electric motor 307 is held in meshing engagement with a helical gear 309 formed on a transmission shaft 310. A pinion 311 is formed at a lower end shown of the transmission shaft 310 supported for rotation on a clutch cover 313. The pinion 311 is held in meshing engagement with a rack portion (not shown) formed on a push rod 312 disposed along the axis of a main shaft 306. Consequently, rotational driving force of the electric motor 307 is converted into reciprocating motion of the push rod 312 to allow engagement/disengagement control of the clutch.

Figure 36:
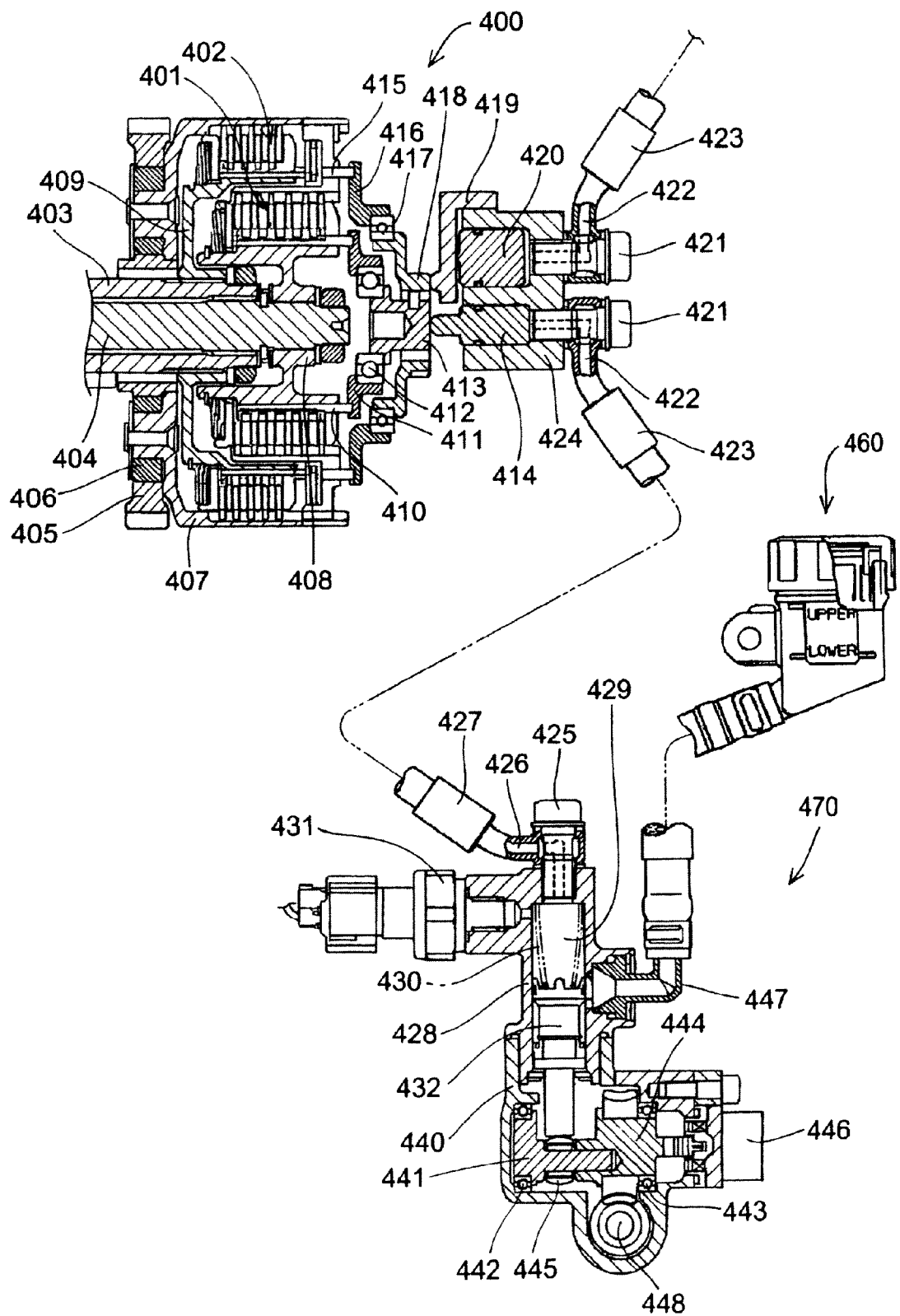
FIG. 36 is a schematic view of a general configuration of an electric-hydraulic clutch.
Figure 37:
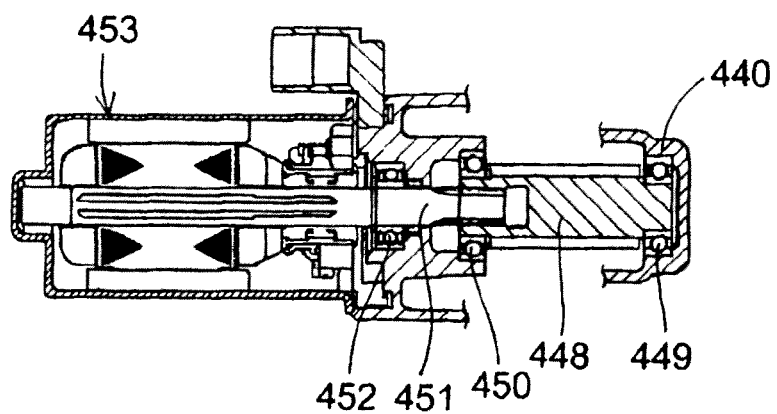
FIG. 37 is a sectional view of an electric motor of the electric-hydraulic clutch.

FIG. 36 is a general schematic view of an electric-hydraulic clutch 400 which operates with oil pressure generated by rotational driving force of an electric motor 453. Meanwhile, FIG. 37 is a sectional view of the electric motor 453. The electric-hydraulic clutch 400 is a twin clutch of the normally open type wherein a first clutch 401 and a second clutch 402 are changed over from a disengaged state to an engaged state by slidably moving the hydraulic pistons 414 and 420 in an axial direction.

A primary driven gear 405 to which rotational driving force is transmitted from a crankshaft (not shown) is secured to a clutch outer 407 through a plurality of dampers 406. If the first clutch 401 is placed into an engaged state, then rotational driving force of the clutch outer 407 is transmitted to an inner shaft 404 through a first central cylindrical portion 408. On the other hand, if the second clutch 402 is placed into an engaged state, then the rotational driving force of the clutch outer 407 is transmitted to an outer shaft 403 through a second central cylindrical portion 409.

A first hydraulic piston 414 and a second hydraulic piston 420 are accommodated in a hydraulic cylinder 424 secured to a clutch cover or the like. A banjo 423 which is a pipe connecting device for supplying oil pressure to the oil pressure supplying chamber is secured to the hydraulic cylinder 424 by a banjo bolt 421. And, if oil pressure is supplied to duct lines 422 by driving force of the electric motor 453 hereinafter described, then the hydraulic pistons 414 and 420 are slidably moved leftwardly in the figure.

If a push block 413 supported for rotation on a bearing 412 is pressed by the first hydraulic piston 414, then a push plate 411 supported for rotation on the other side of the bearing 412 and a cylindrical push ring 410 which engages with the push plate 411 are pressed. Consequently, a plurality of clutch plates and a plurality of clutch discs frictionally engage with each other so that the first clutch 401 is changed over to an engaged state. On the other hand, if a push block 418 supported for rotation on a bearing 417 is pressed through an auxiliary plate 419, then a push plate 416 supported for rotation on the other side of the bearing 417 and a cylindrical push ring 415 which engages with the push plate 416 are pressed. Consequently, a plurality of clutch plates and a plurality of clutch disks are frictionally engaged with each other and the second clutch 402 is changed over to an engaged state.

Oil pressure to be supplied to the hydraulic cylinder 424 is generated by an oil pressure generating apparatus 470. The electric motor 453 is attached to a machine chamber case 440 of the oil pressure generating apparatus 470. A rotary shaft 451 of the electric motor 453 is spline-fitted with a worm 448 which meshes with a worm wheel 444. The rotary shaft 451 and the worm 448 are supported for rotation on the machine chamber case 440 by bearings 452, 449 and 450.

An eccentric shaft of an eccentric cam 441 supported for rotation on the machine chamber case 440 by a bearing 442 engages with the worm wheel 444 supported for rotation on the machine chamber case 440 by a bearing 443. A pressing member 445 for contacting with an end portion of a hydraulic piston 432 accommodated in a hydraulic chamber case 428 is attached to the eccentric shaft of the eccentric cam 441. By the configuration described, if the electric motor 453 is driven to rotate, then the eccentric shaft pushes the hydraulic piston 432 upwardly in the figure by rotation of the worm wheel 444 so that oil pressure is generated in a hydraulic chamber 429.

A banjo 427, which is a pipe connecting device is secured to the hydraulic chamber case 428 by a banjo bolt 425. Oil pressure generated in the hydraulic chamber 429 is transmitted to the hydraulic cylinder 424 through a duct line 426. The banjo bolt 425 on the hydraulic chamber case 428 side and the banjo 423 on the hydraulic cylinder side are connected to each other by a pressure-resisting rubber hose or the like.

A supplementation port 447 connected to a reservoir tank 460 for supplementing fluid to be filled into the hydraulic chamber 429 is attached to the hydraulic chamber case 428. Meanwhile, a rotational angle sensor 446 for detecting the rotational angle of the worm wheel 444 is attached to the machine chamber case 440, and an oil pressure sensor 431 for detecting the oil pressure of the hydraulic chamber 429 is attached to the hydraulic chamber case 428. It is to be noted that, while this figure shows only the oil pressure generating apparatus 470 for operating the first clutch 401, oil pressure is supplied to the second clutch 402 from a separate independent oil pressure supplying apparatus, and the first clutch 401 and the second clutch are controlled individually.

It is to be noted that the configuration of the twin clutch type transmission, the configuration of the ECU as a shift change controlling apparatus, the form of the data tables and so forth are not limited to those of the embodiment described hereinabove but allow various modifications. For example, each clutch may be a single clutch and the engaging force or operating force of the same may be obtained from a spring, a motor, a solenoid or the like, or each clutch may be a dry type clutch or a single plate clutch. Further, the engine may be a multi-cylinder engine such as a V type engine or a horizontally opposed engine or may be a longitudinally mounted engine or the like wherein a crankshaft extends along the vehicle forward and backward direction in addition to a single cylinder engine. Further, the transmission may be of the type wherein a slide member separate from gears is slidably moved to change over the shift change stage or the shift change stage number may be lower than 5 or greater than 7. The shift change controlling apparatus according to the present invention can be applied to various vehicles such as motorcycles and tricycles.

DESCRIPTION OF REFERENCE SYMBOLS

13 . . . Engine,
42 . . . ECU (shift change controlling apparatus),
24a . . . Shift drum,
26 . . . Twin clutch,
39c . . . Shift controlling motor,
51a . . . First clutch,
51b . . . Second clutch, 9
1a . . . First clutch actuator,
91b . . . Second clutch actuator,
100 . . . Shift change controlling section,
110 . . . Clutch oil pressure detection section,
120 . . . Stroke start oil pressure detection section,
130 . . . Stroke end oil pressure detection section,
140 . . . Ratio detection section,
150 . . . Clutch control correction amount calculation section,
160 . . . Pre-shift change waiting time setting section,
200 . . . Basic clutch capacity calculation section,
201 . . . Engine torque estimation section,
210 . . . Clutch capacity correction section on occurrence of racing,
211 . . . Racing detection section,
220 . . . Clutch capacity correction section on shift change time excess,
221 . . . Shift change time excess detection section,
230 . . . Target clutch capacity calculation section,
240 . . . Target partial clutch engagement oil pressure calculation section,
SE1 . . . Gear position sensor,
SE3 . . . Engine speed sensor,
SE7 . . . Oil temperature sensor,
SE8 . . . First clutch oil pressure sensor,
SE9 . . . Second clutch oil pressure sensor,
SE10 . . . Inner shaft speed sensor,
SE11 . . . Outer shaft speed sensor,
SE19 . . . Countershaft speed sensor,
TS . . . Throttle opening sensor

The invention claimed is:

1. A shift change controlling apparatus, comprising:
a control unit configured to control a shift change operation in a twin-clutch-type transmission, by alternately changing an engagement state of a first clutch and a second clutch; and
a pre-pressure supplying unit configured to supply a pre-pressure on an unengaged one of the first and second clutches during execution of a pre-shift change while the other one of the first and second clutches is engaged, wherein the pre-pressure provides a pre-engagement of the unengaged clutch for operating by a small amount toward the engagement side and creating in advance a state in which power transmission using a shift gear train corresponding to a next shift position can be carried out,
wherein the control unit is further configured to issue a signal for removing the pre-pressure,
wherein the control unit is further configured to determine a predetermined pre-shift change waiting time, and
wherein the control unit is further configured to provide the predetermined pre-shift change waiting time between a point in time when the signal for removing the pre-pressure is issued by the control unit and a point in time when the pre-shift change is started, and the duration of the predetermined pre-shift change waiting time is determined based upon a speed of rotation of main shafts.

2. The shift change controlling apparatus according to claim 1, wherein the pre-pressure is applied for a predetermined period during the execution of the pre-shift change, and the control unit is configured to determine the predetermined period based upon a viscosity of an operating oil of the first and second clutches.

3. The control apparatus according to claim 2, wherein the predetermined period is determined based upon a speed of rotation of main shafts supporting the first and second clutches.

4. The control apparatus according to claim 3, wherein the predetermined period is increased as the speed of rotation of the main shaft increases.

5. The control apparatus according to claim 4, wherein the predetermined period is increased as the viscosity of the operating oil increases.

6. The control apparatus according to claim 1, wherein the pre-pressure is applied for a predetermined period during the execution of the pre-shift change, and the control unit is configured to determine the predetermined period based on a viscosity of an operating oil of the first and second clutches, and wherein the viscosity of the operating oil determined based upon an oil temperature thereof.

7. The control apparatus according to claim 1, further comprising:
an oil pressure determining unit configured to determine an oil pressure in an oil pressure supply path,
wherein the pre-pressure is applied for a predetermined period during the execution of the pre-shift change, and the control unit is configured to determine the predetermined period based upon a calculation performed after an output value from the oil pressure determining unit drops below a predetermined value.

8. The control apparatus according to claim 1, wherein the pre-pressure is applied for a predetermined period during the execution of the pre-shift change, and the control unit is configured to determine the predetermined period based upon whether or not the pre-shift change is associated with an upshift or a downshift.

9. The control apparatus according to claim 1, wherein the pre-pressure is applied for a predetermined period during the execution of the pre-shift change, and the control unit is configured to apply the predetermined period after a release of an engaged one of the first and second clutch to enable disengagement of a dog clutch in the transmission, and to establish a neutral state.

10. The control apparatus according to claim 9, wherein the pre-pressure is applied for a predetermined period during the execution of the pre-shift change, and the predetermined period is determined based upon whether or not the pre-shift change is for an upshift or for a downshift, and wherein the predetermined period is set to be longer in a case of a downshift rather than in a case of an upshift.

* * * * *